(12) United States Patent
Maruyama et al.

(10) Patent No.: US 11,977,362 B2
(45) Date of Patent: May 7, 2024

(54) CONTROL DEVICE AND DISTRIBUTED CONTROL SYSTEM

(71) Applicant: Hitachi, Ltd., Tokyo (JP)

(72) Inventors: Tatsuya Maruyama, Tokyo (JP); Yusaku Otsuka, Tokyo (JP); Hidenori Omiya, Tokyo (JP); Toshiki Shimizu, Tokyo (JP); Iori Kobayashi, Tokyo (JP); Kazutaka Onishi, Tokyo (JP); Noritaka Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 17/770,416

(22) PCT Filed: Aug. 19, 2020

(86) PCT No.: PCT/JP2020/031215
§ 371 (c)(1),
(2) Date: Apr. 20, 2022

(87) PCT Pub. No.: WO2021/079599
PCT Pub. Date: Apr. 29, 2021

(65) Prior Publication Data
US 2022/0382235 A1  Dec. 1, 2022

(30) Foreign Application Priority Data
Oct. 24, 2019 (JP) .................................. 2019-193219

(51) Int. Cl.
*G05B 19/418* (2006.01)
*G05B 19/042* (2006.01)

(52) U.S. Cl.
CPC ............ *G05B 19/0423* (2013.01); *G05B 2219/25213* (2013.01)

(58) Field of Classification Search
CPC ............................. B25J 9/1664; B25J 9/1671
See application file for complete search history.

(56) References Cited

U.S. PATENT DOCUMENTS 10,647,528 B1 * 5/2020 Diankov ................ B25J 9/1664
2005/0201408 A1   9/2005 Otani et al.
(Continued)

FOREIGN PATENT DOCUMENTS

JP          07-219902 A        8/1995
JP        2003-311498 A       11/2003
(Continued)

OTHER PUBLICATIONS

International Search Report of PCT/JP2020/031215 dated Nov. 17, 2020.
(Continued)

*Primary Examiner* — Getente A Yimer
(74) *Attorney, Agent, or Firm* — MATTINGLY & MALUR, PC

(57) ABSTRACT

In the conventional distributed control system, since each control device updates the data area at a timing when a control packet is received, in a case where there is a difference in communication delay between the control devices or in a case where the communication delay includes jitter, it is difficult to match the contents of data in all the control devices in a case of focusing on a certain moment during system operation. Therefore, depending on the start timing of a control application, the control application operates on the basis of different data between the control devices, thus limiting control performance improvement. Accordingly, time slots on the network are allocated according to the result of a calculation unit, and a cyclic memory synchronization update unit synchronizes the timing of reflecting data in the input/output and the cyclic memory and the timing of using data of a cyclic memory.

7 Claims, 22 Drawing Sheets

(56) References Cited

U.S. PATENT DOCUMENTS

| | | | |
|---|---|---|---|
| 2007/0135933 A1* | 6/2007 | Panesse | B25J 9/1671 |
| | | | 700/17 |
| 2016/0292110 A1 | 10/2016 | Niwa et al. | |
| 2018/0178376 A1* | 6/2018 | Lalonde | B25J 9/1651 |
| 2019/0286565 A1* | 9/2019 | Aida | G11B 19/28 |
| 2019/0286908 A1* | 9/2019 | Shintani | G06N 5/04 |
| 2020/0366513 A1 | 11/2020 | Yoneda et al. | |
| 2021/0135836 A1 | 5/2021 | Yoneda | |
| 2021/0323157 A1* | 10/2021 | Usui | B25J 9/1671 |

FOREIGN PATENT DOCUMENTS

| | | |
|---|---|---|
| JP | 2004-302626 A | 10/2004 |
| JP | 2005-293569 A | 10/2005 |
| JP | 2019-062288 A | 4/2019 |
| JP | 2019-080164 A | 5/2019 |

OTHER PUBLICATIONS

Extended European Search Report received in corresponding European Application No. 20878358.9 dated Sep. 28, 2023.
"Consistent Data Synchronization with S7 Communication between Several Substations and One Head PLC", Aug. 1, 2019, pp. 1-50, URL: https://cache.industry.siemens.com/dl/files/214/40556214/att_995023/v1/40556214_S7-Comm_Sync_DOC_V2.1_en.pdf.
Japanese Office Action received in corresponding Japanese Application No. 2019-193219 dated Aug. 15, 2023.

* cited by examiner

CONTROL DEVICE AND DISTRIBUTED CONTROL SYSTEM

TECHNICAL FIELD

The present invention relates to an information processing device, information processing hardware, information processing software, and a communication technology. Among them, the present invention particularly relates to a control system having a network, a control device constituting the control system, and a control or communication method using the control system and the control device.

BACKGROUND ART

As a control system, there is a configuration in which a controller controls a single or a plurality of control targets via a network. In such a control system, an appropriate control network is selected and applied according to the use, conditions, and requirements of the control system. From a technical point of view, it can be said that technological progress of the control network has been brought about by the advance of the requirements of those control systems. There are various requirements for such a control network, such as communication delay, cost reduction, the number of connected devices, accuracy of time synchronization, connection distance, commonality of communication media and communication data models, and redundant communication.

A communication scheme configured by a series of IEEE standards called Time Sensitive Network (TSN) is a network in which time determinism in a communication delay between communication devices is improved by introducing time slot communication based on time division. The IEEE 802.3 standard can be applied to a control system.

In addition, a series of real-time Ethernet standardized by IEC 61784 or the like is a representative example of a control network that defines a function for a control system with respect to IEEE 802.3 method widely used in the IT field and is intended to be applied to the control system.

These IEEE 802.3 based control networks have technical advantages over conventional control networks, such as wider communication bandwidths.

On the other hand, there is a cyclic memory system as a communication method between controllers for a distributed control system. In the cyclic memory system, data allocated by the own controller is periodically broadcast to other controllers with respect to a cyclic memory which is a set of memories allocated by each controller constituting the distributed control system. As a result, data can be shared between the controllers, a communication load of the controllers can be reduced, and an influence on operation can be reduced.

CITATION LIST

Patent Literature

PTL 1: JP 7-219902 A
PTL 2: JP 2019-062288 A

SUMMARY OF INVENTION

Technical Problem

The invention of PTL 1 relates to a cyclic memory system, and discloses a network adapter that reduces a reception processing load. In the cyclic memory system, since the cyclic memory area is updated at the timing when each communication device receives a packet, in a case where there is a difference in communication delay between the controllers or in a case where the communication delay includes jitter, it is difficult to match the contents of the cyclic memory in all the controllers in a case of focusing on a certain moment during operation of the control system. Therefore, depending on the start timing of a control application, the control application operates on the basis of different data between the controllers, and thus there is a limit to improvement in control performance.

PTL 2 discloses a configuration that "each of the plurality of control devices includes a master communication unit that transmits and receives first data to and from another control device via a first network, and a slave communication unit that transmits and receives second data to and from one or a plurality of devices via a second network. The master communication unit includes a first timer which is time-synchronized with each other among the plurality of control devices. The slave communication unit determines a timing at which a process of transmitting the second data to one or a plurality of devices is to be started based on the time of the first timer". However, since the configuration is limited to the transmission of the data of the target device, it is difficult to enjoy the effect of the cyclic memory system, and there is a problem that the configuration is limited to a simple configuration in which the master-slave relationship between the network structure and the control application is in the forward direction in order to avoid a problem that occurs when the communication delay is different.

Solution to Problem

In order to solve the above problems, the present invention allocates time slots on a network and synchronizes writing and reading (access) of data in each node of the network. That is, the time is adjusted in each node, data is received and then temporarily stored (buffered), and the data is written in a common data area such as a cyclic memory at the same timing in each node. Here, a TSN standardization function may be used for synchronization.

A more detailed aspect of the present invention is a control device constituting a distributed control system for performing control on a controlled device. The control device includes: a unit configured to execute time synchronization with another control device constituting the distributed control system; a unit configured to receive reception information related to the other control device; a unit configured to temporarily store the reception information; a common data area for storing the temporarily stored reception information; and a unit configured to control storage in the common data area in synchronization with storage in the common data area in the other control device.

As a typical example of the access in the node, the timing of reflecting data in the input/output and the cyclic memory and the timing of using data in the cyclic memory are synchronized.

In addition, the present invention is preferably applied to a control system as a network. In this case, it is preferable to synchronize output or read timings of the control commands.

Further, it is also an aspect of the present invention to synchronize inputting and writing of sensor information. The sensor information includes sensor information from a device (an actuator device, etc.) outside the network.

Advantageous Effects of Invention

Communication performance and reliability of the network can be improved. In addition, utilization efficiency of network resources can be improved.

DESCRIPTION OF EMBODIMENTS

A control system using a control network according to an embodiment of the present invention will be described below.

System Example

Figure 1:
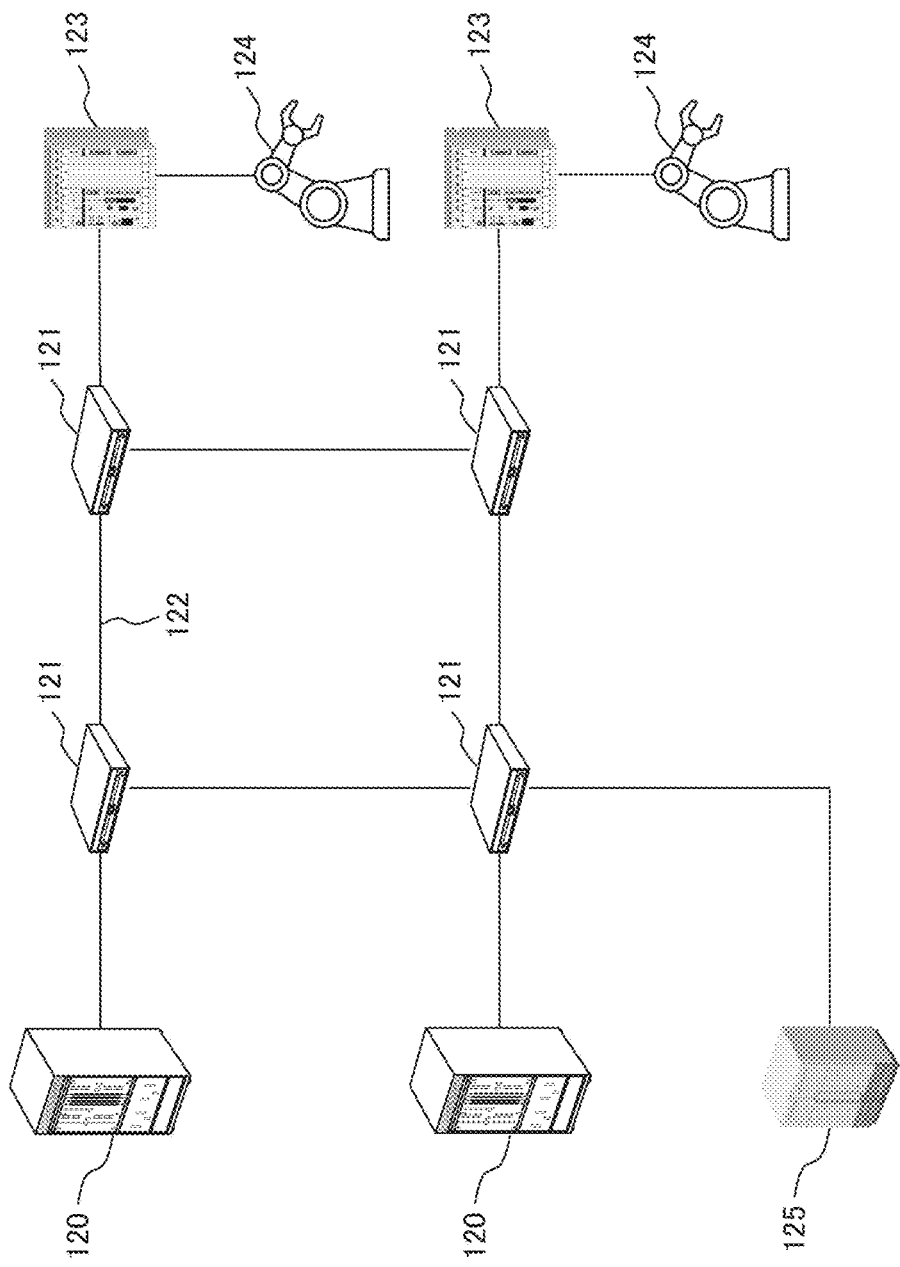
FIG. 1 is a system configuration diagram using an embodiment of the present invention.

A system configuration to which the present embodiment is applied is illustrated in FIG. 1. A control device 120 is connected to and communicates with an input/output control device 123 via a control network 122 and a network relay device 121.

The control device 120 transmits and receives a communication packet to and from the input/output control device 123 to execute transmission of a control command (also referred to as a control command value) for controlling a controlled device 124, acquisition of measurement values and sensor information of the controlled device 124, and various settings.

The control device 120 exchanges sampling data, a control command, and a state signal in each control system as in a central control device of a distributed control system (DCS) and protection relays of an electric power system. Data in the same control system may be stored in a packet.

Examples of the control device 120 include a dedicated controller, an industrial personal computer, a controller, a DCS controller, a supervisory control and data acquisition (SCADA) server, a programmable logic controller (PLC), an intelligent electronic device (IED), a protection relay, a cloud, and a server.

The network relay device 121 is a relay device in the control network 122, and routes and transfers packets communicated by the control device 120, the input/output control device 123, and the network relay device 121. Examples of the network relay device 121 include various network relay devices such as a network switch including a TSN compatible switch, an L2 switch, and an L3 switch, a bridge, a router, a transparent clock (TC) and a boundary clock (BC) of IEEE 1588, an OpenFlow switch, and RedBox, QuadBox, an optical switch, an optical multiplexer, and an optical splitter defined by IEC 62439-3.

The control network 122 is a network that connects the control device 120, the input/output control device 123, and the network relay device 121. Examples of the network include various industrial networks including a control network defined by IEEE 802.3 (Ethernet), IEC 61784, Communication Profile Family 12 of IEC 61784-2 (hereinafter, referred to as EtherCAT (registered trademark)), IEC 61158, IEEE communication standards related to TSN, Distributed Network Protocol (DNP) 3, IEC 61970, High availability Seamless Ring (HSR) and Parallel Redundancy Protocol (PRP) in IEC 62439-3, a ring network, an RPR method of IEEE 802.17, Controller Area Network (CAN: registered trademark), DeviceNet, RS-232C, RS-422, RS-485, ZigBee (registered trademark), Bluetooth (registered trademark), IEEE 802.15, IEEE 802.1, mobile communication, OpenADR, ECHONET Lite (registered trademark), OpenFlow (registered trademark), and the like.

In addition, the following is a master protocol in the protocol stack. IEC 61850, OPC UA (Unified Architecture), DDS (Data Distribution Service), IEC 61850-7-420, and IEC 60870-5-104 are exemplified. Alternatively, the above protocols may be hierarchized. For example, the OPC UA standard is applied to the content of the data area on the TSN.

The input/output control device 123 is connected to the controlled device 124, and controls and sets the controlled device 124 according to a control command received from the control device 120 via the control network 122. In addition, the state and information of the controlled device 124 are acquired and transmitted to the control device 120 via the control network 122.

Examples of the input/output control device 123 include a dedicated controller, an industrial personal computer, a controller, a DCS controller, a SCADA device, a PLC, an IED, a merging unit (MU), and a protection relay.

The controlled device 124 is a device or a device controlled by the input/output control device 123. Examples of the controlled device 124 include an industrial robot such as a mobile robot or a robot arm, a chip mounter, a machine tool table, a processing device, a machine tool, and a semiconductor manufacturing device. Alternatively, a motor, an inverter, a power device such as a circuit breaker and a disconnector, and various sensors (encoder, temperature sensor, pressure sensor, etc.) in the manufacturing apparatus are exemplified.

A network management device 125 controls network resources related to communication of the control device 120, the network relay device 121, and the input/output control device 123. Examples of such a network resource include a communication bandwidth, a time width in a timeslot communication method, setting of priority or the like for a specific communication type, the number of communication paths to be used, and the like.

The network management device 125 can communicate with the control device 120, the network relay device 121, and the input/output control device 123 to acquire the states of the control device 120, the network relay device 121, and the input/output control device 123.

Examples of the network management device 125 include a communication control device such as an OpenFlow controller in SDN and a dedicated communication device.

In FIG. 1, the two network relay devices 121 are connected between the control device 120 and the input/output control device 123, but the number of network relay devices may be different or a plurality of communication paths may be provided.

In addition, although the control device 120 and the input/output control device 123 will be described separately for the sake of description, both roles may be provided in one device.

In addition, a plurality of or one control device 120 may be provided in the control system.

As a system configuration illustrated in FIG. 1, a control system such as a DCS for a factory automation (FA) or a process automation (PA), and a monitoring control and protection control system in the power field are exemplified. Further, an industrial device, a semiconductor manufacturing device, an in-vehicle system, a control system in a construction machine or a railway vehicle, a railway ground signal system, a control system in an aircraft, and the like are also exemplified. Alternatively, an IoT system or the like that analyzes information collected via the control network 122 with artificial intelligence on the control device 120 or a cloud or computer (not illustrated) to improve the performance of the control system is exemplified.

(Hardware Configuration)

Figure 2:
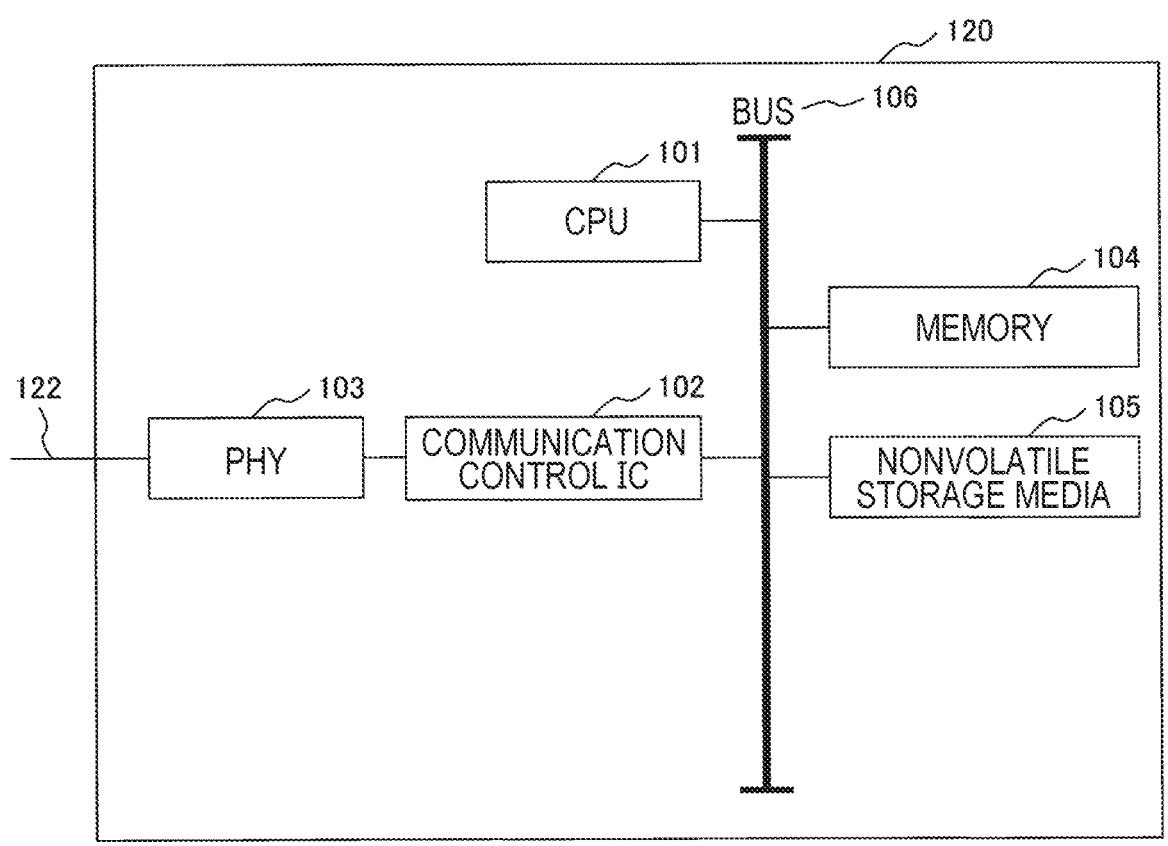
FIG. 2 is a hardware configuration diagram according to an embodiment of the present invention.

FIG. 2 illustrates a hardware configuration of the control device 120.

A CPU 101 transfers a program from a nonvolatile storage medium 105 to a memory 104 and executes the program. Examples of an execution processing program include an operating system (hereinafter referred to as OS) and an application program operating on the OS. The program operating on the CPU 101 acquires operation setting and state information of a communication control IC 102.

The communication control IC 102 receives a transmission request and transmission data from software running on the CPU 101, and transmits the transmission request and transmission data to the control network 122 using a PHY 103. In addition, the data received from the control network 122 is transferred to the CPU 101, the memory 104, and the nonvolatile storage medium 105 via a bus 106.

Further, the communication control IC 102 has a function for executing a time synchronization protocol using a network. That is, it is a clocking function at the time of transmission and reception of the time synchronization packet, setting and addition of the correction value to the synchronization packet, and the like.

Examples of such a time synchronization protocol include IEEE 1588, IEEE 802.1 AS, NTP, and SNIP. Correction Field (CF) of IEEE 1588 is exemplified as a correction value. In addition, it is exemplified that a time management function based on the synchronous time is provided. Examples of such a time management function include generation of an interrupt signal and an alarm signal at a set time, generation of an interrupt signal and an alarm signal at a predetermined cycle, and presentation of synchronized time information to another functional unit and another device.

Examples of implementation of the communication control IC 102 include ICs such as a field programmable gate array (FPGA), a complex programmable logic device (CPLD), an application specific integrated circuit (ASIC), and a gate array. Alternatively, it may be integrated with the CPU 101. The communication control IC 102 may be an IEEE 802.3 communication device including a MAC layer and a PHY layer, or may include a PHY function in the communication control IC 102. In this case, examples of implementation of the communication control IC 102 include a media access control (MAC) chip compliant with the IEEE 802.3 standard, a physical layer (PHY) chip, and a composite chip of MAC and PHY. Note that the communication control IC 102 may be included in the CPU 101 or a chip set that controls an information path inside a computer. In addition, although one communication control IC 102 is illustrated in the configuration of FIG. 2, the number of communication control ICs 102 may be plural.

The PHY 103 is a transceiver IC having a communication function with the control network 122. A physical layer (PHY) chip of IEEE 802.3 is exemplified as a communication standard provided by the PHY 103. Note that, in the configuration of FIG. 2, since the PHY 103 and the communication control IC 102 are connected, processing of a media access control (MAC) layer of IEEE 802.3 is included in the communication control IC 102. However, also in a configuration in which an IC that provides the MAC function is arranged between the communication control IC 102 and the PHY 103 or in a configuration in which a communication IC obtained by combining the IC that provides the MAC function and the PHY 103 and the communication control IC 102 are connected, the effect of this embodiment is not lost. The PHY 103 may be included in the communication control IC 102. Although one PHY 103 is illustrated in the configuration of FIG. 2, the number of PHYs 103 may be plural.

The memory 104 is a temporary storage area for the CPU 101 to operate, and stores the OS, the application program, and the like transferred from the nonvolatile storage medium 105.

The nonvolatile storage medium 105 is an information storage medium, and is used for storing an OS, an application, a device driver, or the like, a program for operating the CPU 101, and a result of execution of the program. Examples of the nonvolatile storage medium 105 include a hard disk drive (HDD), a solid state drive (SSD), and a flash memory. Examples of the removable external storage medium include a floppy disk (FD), a CD, a DVD, Blu-ray (registered trademark), a USB memory, and a CF card.

The bus 106 connects the CPU 101, the communication control IC 102, the memory 104, and the nonvolatile storage medium 105. Examples of the bus 106 include a PCI bus, an ISA bus, a PCI Express bus, a system bus, and a memory bus.

(Hardware Configuration of Input/Output Control Device 123)

Figure 3:
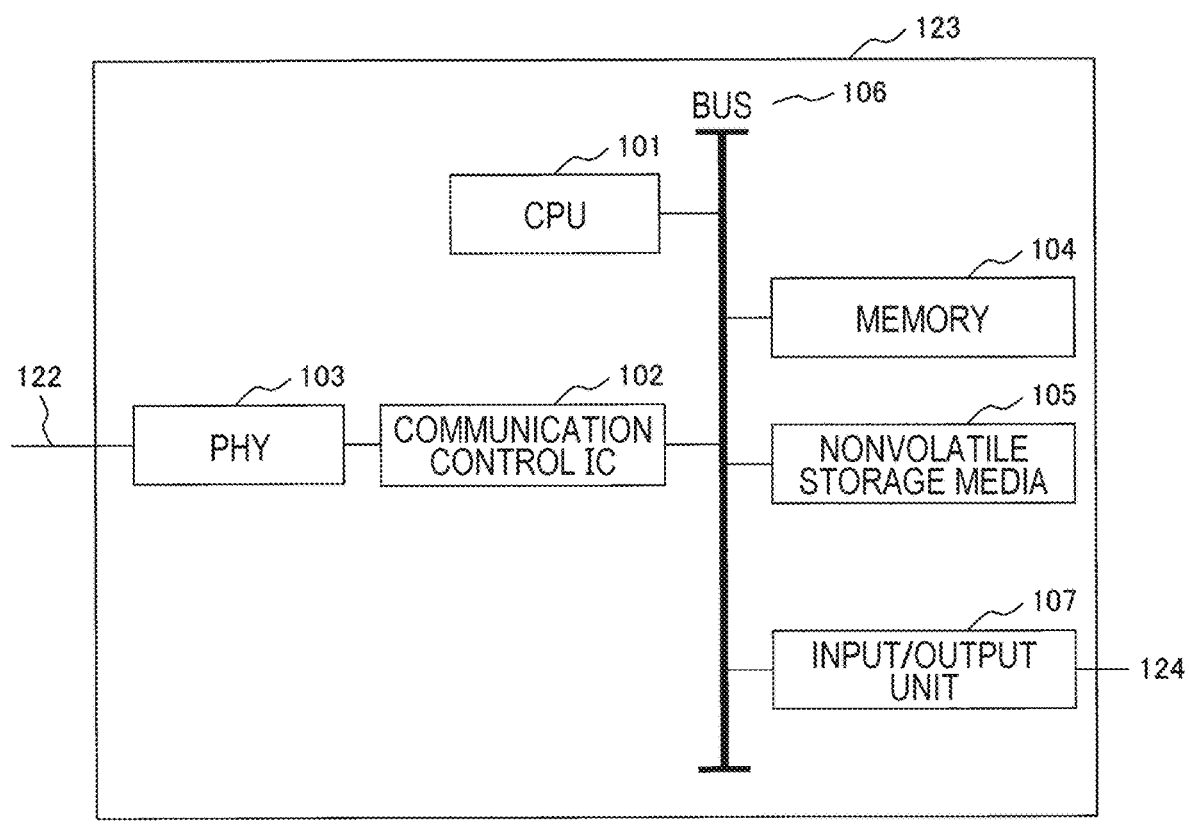
FIG. 3 is a hardware configuration diagram according to an embodiment of the present invention.

FIG. 3 illustrates a hardware configuration of the input/output control device 123.

An input/output unit 107 is an input/output interface for controlling the controlled device 124 or acquiring information of the controlled device 124.

Examples of the input/output unit 107 include various digital input/output and analog input/output ICs. Although one signal line from the input/output unit 107 is illustrated, a plurality of signal lines may be provided depending on the configuration on the controlled device 124 side.

(Functional Configuration of Control Device 120)

Figure 4:
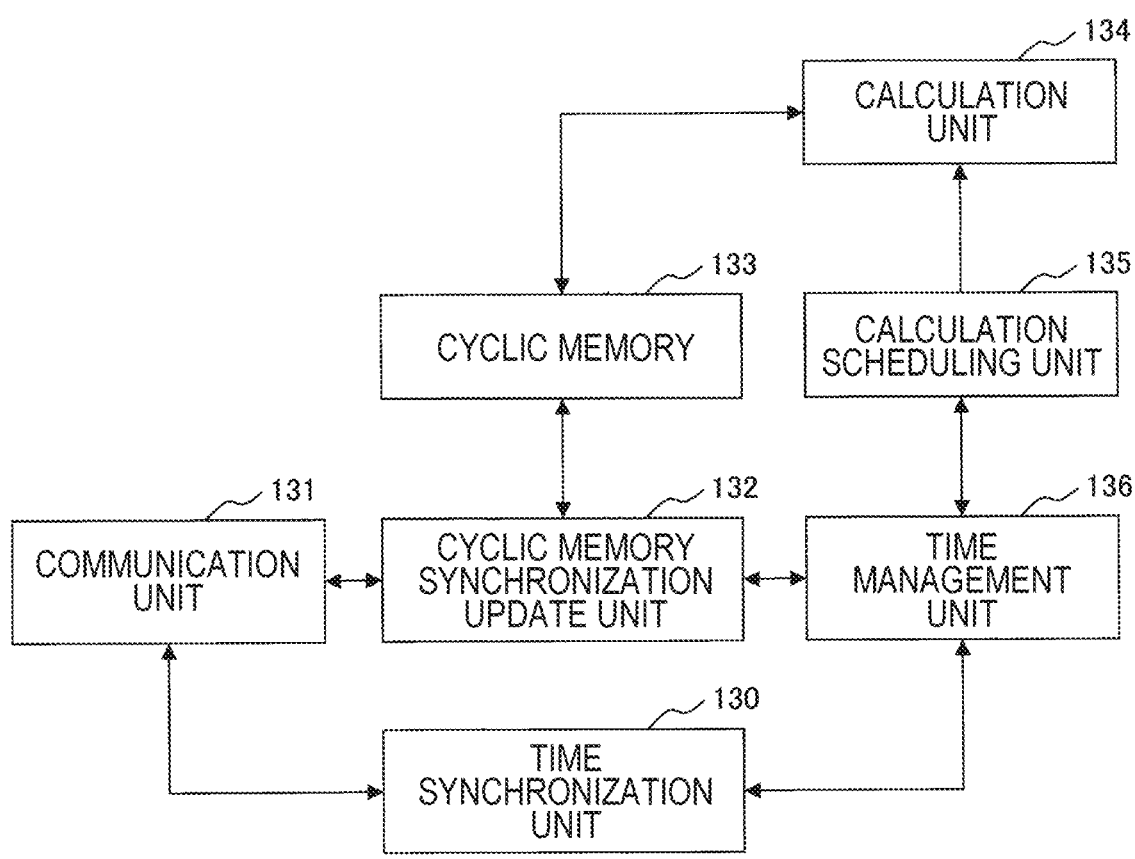
FIG. 4 is a functional configuration diagram illustrating an embodiment of the present invention.

A functional configuration of the control device 120 is illustrated in FIG. 4.

A time synchronization unit 130 is a functional unit that executes a time synchronization procedure. Examples of the time synchronization protocol to be executed include IEEE 1588, NTP, and SNIP. A communication unit 131 performs time synchronization with another device by using the time measured at the time of transmission or reception of the time synchronization packet.

The time synchronization unit 130 may be realized by the CPU 101 or an application that operates on the CPU 101, or may be realized as hardware logic in a case where the communication control IC 102 is configured by an FPGA or a CPLD. Alternatively, both the software on the CPU 101 and the communication control IC 102 may be used. In this case, the communication control IC 102 processes a packet transmission timing, a packet reception timing measurement function, or packet format generation.

The communication unit 131 is a functional unit that is connected to the control network 122 and performs communication in accordance with a communication protocol of the control network 122. The configuration includes any one or a plurality of software operating on the CPU 101, the communication control IC 102, and the PHY 103.

A cyclic memory synchronization update unit 132 holds the communication content received from the communication unit 131, and reflects the held information in a cyclic memory 133 by time information or time notification notified from a time management unit 136, time notification interrupt, or the like.

At this time, the communication content may be shaped (including parameter removal), corrected, or discarded from transmission source information and destination information of a communication content, header information of a communication protocol, or the like. In addition, a write destination address to the cyclic memory 133 may be determined from the information related to the communication content.

Alternatively, the content of the cyclic memory 133 is transferred to the communication unit 131 and transmitted to the control network 122 by the time information or the time notification notified from the time management unit 136, the time notification interrupt, or the like. At this time, the communication content may be shaped and corrected from the transmission source information, the destination information, and the like of the communication content. In addition, the range on the cyclic memory 133 to be transmitted to the communication unit 131 may be designated and selected, or the contents of a plurality of regions may be transmitted in an arbitrary order. These may be stored in one packet and transmitted, or may be stored in a plurality of packets and transmitted.

The cyclic memory synchronization update unit 132 includes any one or a plurality of software operating on the CPU 101, the communication control IC 102, and the memory 104.

The cyclic memory 133 is a memory space shared between controllers. A data area of each controller is associated with the memory space. For example, each controller performs periodic broadcast communication, and the received controller identifies the transmission source controller and updates the corresponding data area.

In order to prevent a plurality of execution subjects (software, functional unit, device, and the like) from failing to maintain consistency of information held by accessing the same area, the cyclic memory 133 has an exclusive control function for access.

The cyclic memory 133 is exemplified by software that operates on the CPU 101, or any one or a plurality of the memory 104 and the nonvolatile storage medium 105.

Note that the cyclic memory 133 holds similar data for its own control data and control data of other nodes in each node. Here, the cyclic memory 133 does not necessarily need to hold similar data by broadcasting. Note that the cyclic memory synchronization update unit 132 performs control to perform such holding.

A calculation unit 134 calculates a control command value necessary for the input/output control device 123 to control the controlled device 124. The control command value for directly controlling the controlled device 124 may be calculated, or the input/output control device 123 may specifically calculate a target value for controlling the controlled device 124. In order to calculate these control command values, information received from the input/output control device 123 may be used. The reception information includes a state signal of the controlled device 124. As described above, in the present embodiment, the control command value is calculated as one of processes related to control.

These processes are executed via the cyclic memory 133. Data allocated to the input/output control device 123 corresponding to the sensor device is read from the cyclic memory 133 as a sensor value and calculated. Then, data allocated to the input/output control device 123 corresponding to an actuator device (hereinafter, actuator) is updated as the control command value.

Examples of the calculation unit 134 include the CPU 101 and software executed on the CPU 101.

A calculation scheduling unit 135 controls the operation of the calculation unit 134 by time information or time notification notified from the time management unit 136, time notification interrupt, or the like.

The calculation scheduling unit 135 includes any one or a plurality of the CPU 101, software executed on the CPU 101, and the communication control IC 102.

The time management unit 136 provides synchronized time according to the time synchronization unit 130. The device serving as a synchronization reference is another device connected via the control network 122 or the own device. The time management unit 136 may have a function of not only providing the synchronous time but also an interrupt notification or an alarm notification at a designated time.

In addition, the interrupt notification and the alarm notification may be repeatedly executed at a predetermined cycle after the specified start time.

In addition, in a case where an abnormality occurs in the time synchronization, the time may be measured according to its own time measuring device (Oscillators, Quartz oscillators, etc.).

In addition, destinations of the interrupt notification and the alarm notification may be functional units and devices specified in advance, or may be simply output to the bus 106 or a connected signal line without specifying a destination.

The time management unit 136 includes any one of or a plurality of the communication control IC 102, a time measuring device included in the CPU 101, an interrupt controller, a dedicated IC device (not illustrated), and software and a scheduler operating on the CPU 101.

(Functional Configuration of Input/Output Control Device 123)

Figure 5:
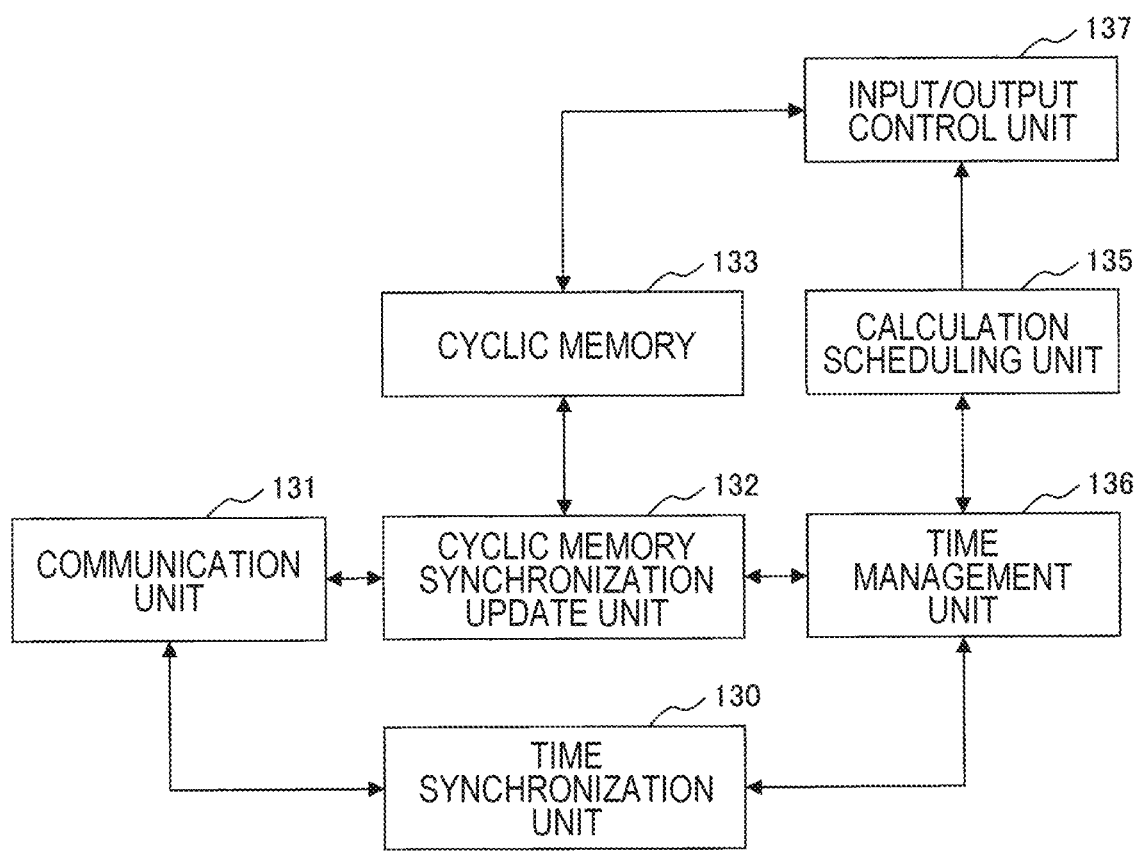
FIG. 5 is a functional configuration diagram illustrating an embodiment of the present invention.

Next, a functional configuration of the input/output control device 123 is illustrated in FIG. 5.

An input/output control unit 137 is activated by the calculation scheduling unit 135 and controls the input/output unit 107 of the input/output control device 123. This control is executed via the cyclic memory 133.

For example, the actuator is controlled using a value of a data area allocated to the own device on the cyclic memory 133 as an instruction value. Alternatively, updating the sensor value with respect to the data area allocated to the own device on the cyclic memory 133 is exemplified.

(Operation Procedure)

An operation procedure of this embodiment to which the present invention is applied is illustrated in FIGS. 6, 7, 8, 9, 10, and 11.

Figure 6:
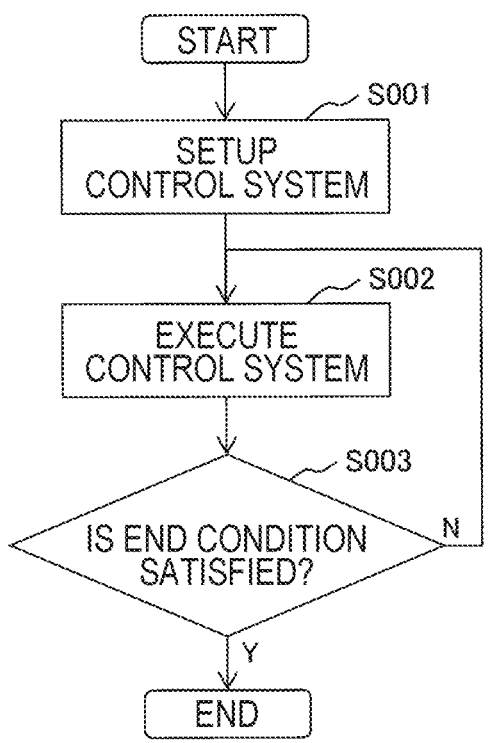
FIG. 6 is a diagram illustrating an operation procedure of an embodiment of the present invention.
Figure 7:
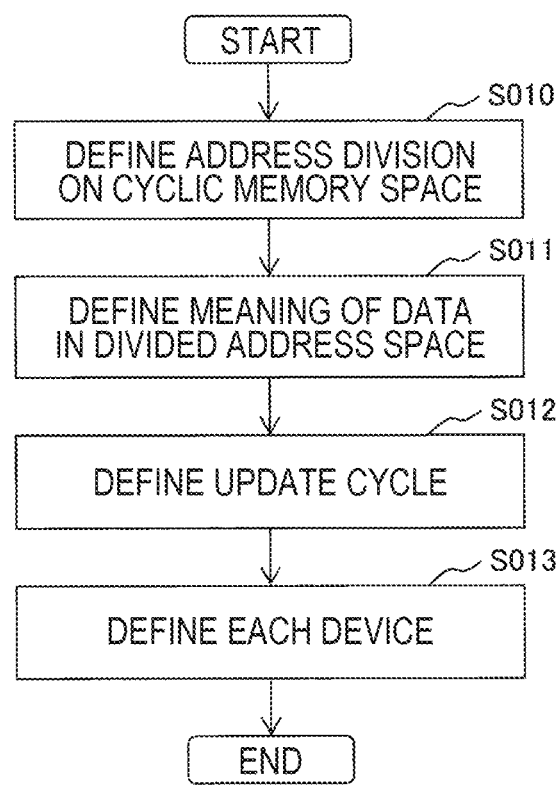
FIG. 7 is a diagram illustrating an operation procedure of an embodiment of the present invention.
Figure 8:
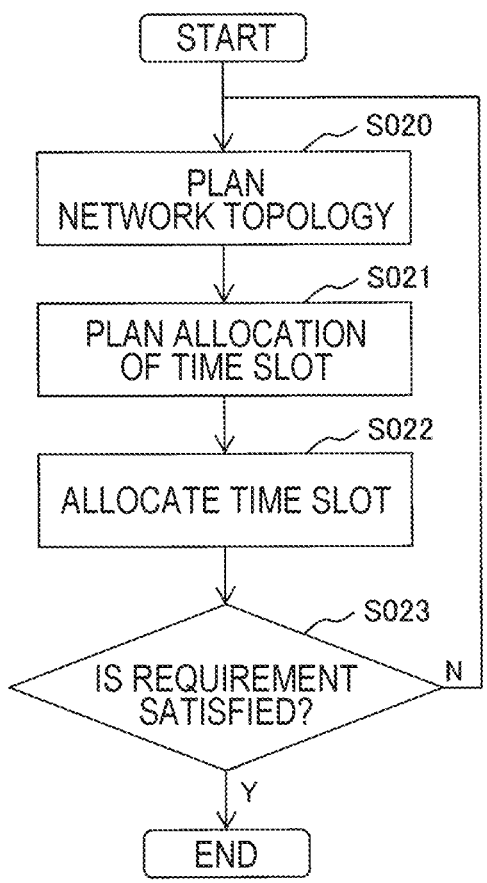
FIG. 8 is a diagram illustrating an operation procedure according to an embodiment of the present invention.
Figure 9:
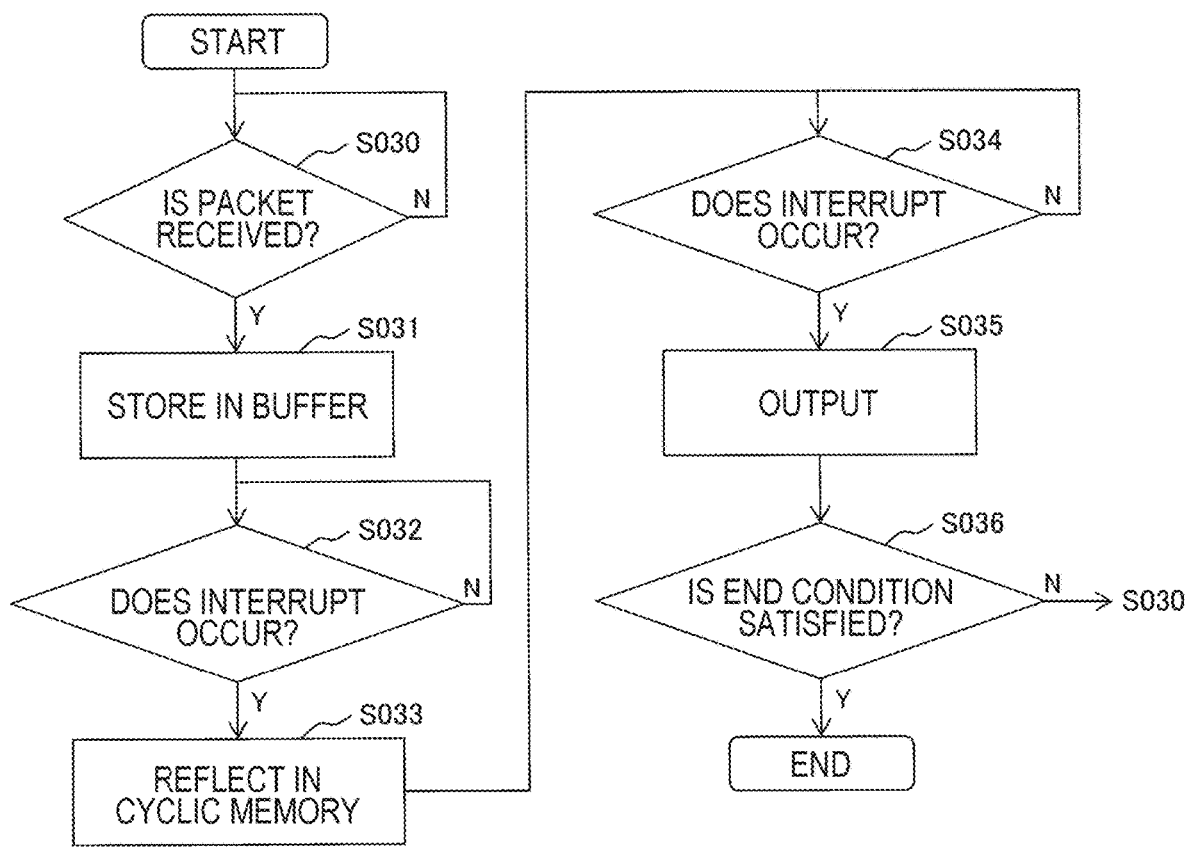
FIG. 9 is a diagram illustrating an operation procedure of an embodiment of the present invention.
Figure 10:
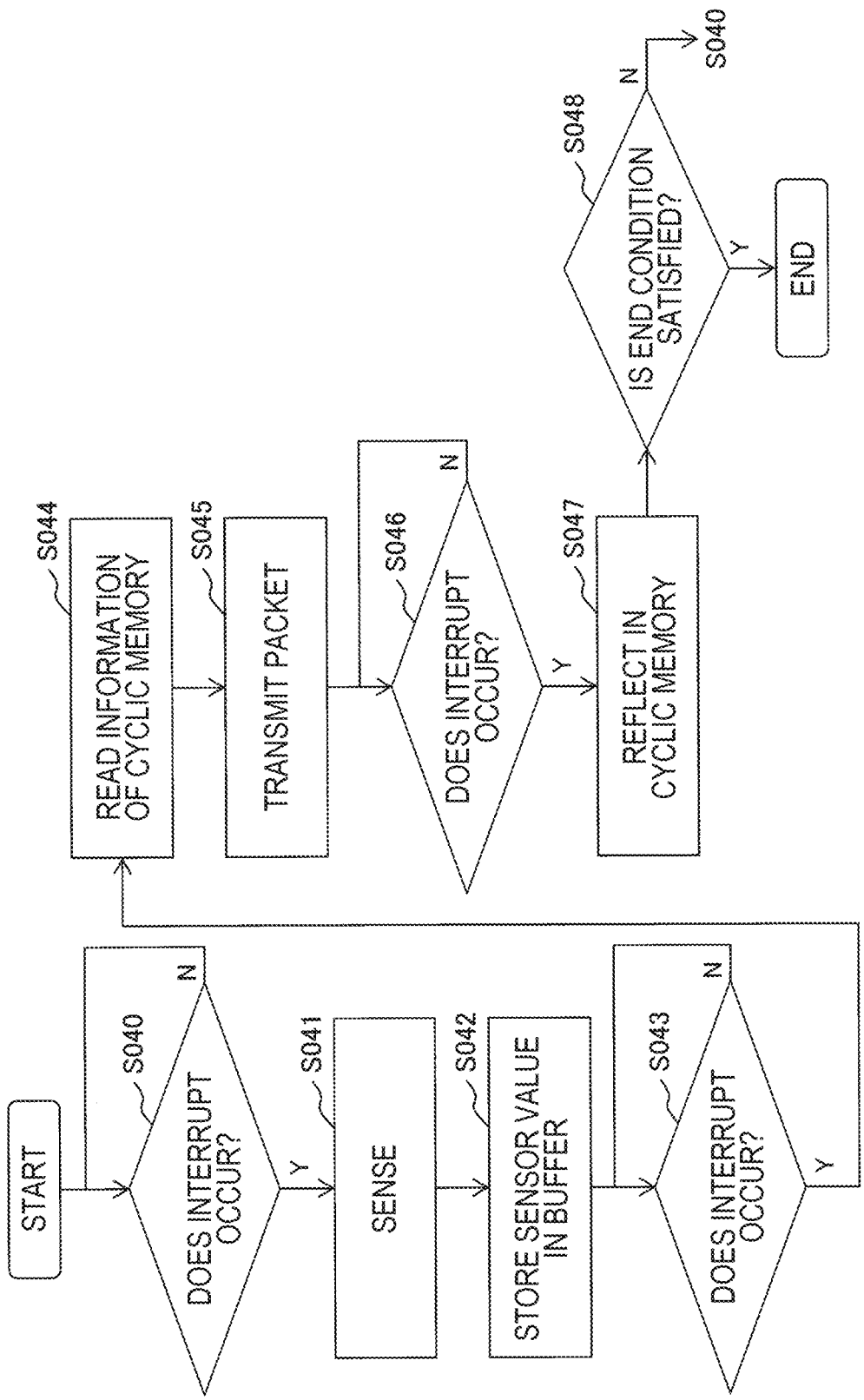
FIG. 10 is a diagram illustrating an operation procedure according to an embodiment of the present invention.
Figure 11:
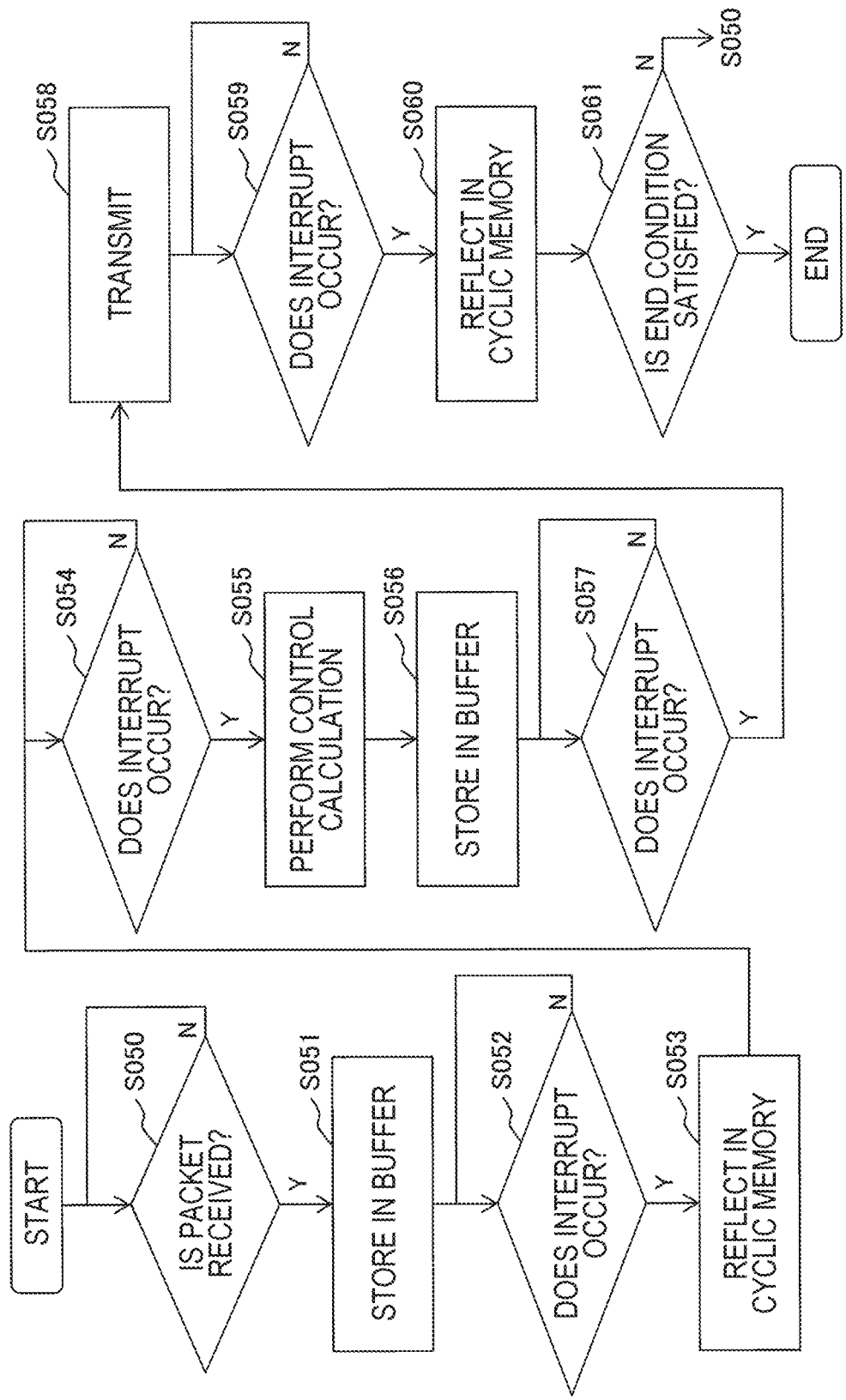
FIG. 11 is a diagram illustrating an operation procedure according to an embodiment of the present invention.

FIG. 6 illustrates the entire operation, FIGS. 7 and 8 illustrate a setting operation at the start, and FIGS. 9, 10, and 11 illustrate a control operation.

(Operation Procedure: Entire Operation)

The overall operation of FIG. 6 will be described. First, setup of the control system is executed (S001). Next, a control operation is executed (S002). Next, it is determined whether an end condition is satisfied (S003). When the end condition is satisfied (Y in S003), the process is ended. When the end condition is not satisfied (N in S003), the control operation in S002 is repeated.

Examples of the end condition include that a predetermined time has been reached, that a predetermined operating time has been reached, and that a predetermined number of times of control has been executed. Alternatively, it is exemplified that predetermined control performance is reached.

In addition, it may be explicitly set to end by an operator, a user, or the like of the control system.

(Operation Procedure: Setup)

Next, a setup operation will be described.

The setup includes settings of the cyclic memory 133 illustrated in FIG. 7 and settings of the control network 122 illustrated in FIG. 8. These settings may be executed in order or may proceed in parallel. Alternatively, the network setting of FIG. 8 is executed after the update cycle or the like of each data is determined by the setting of the cyclic memory 133 of FIG. 7.

(Allocation of Cyclic Memory 133)

The setting of the cyclic memory 133 is illustrated in FIG. 7.

First, address division on the cyclic memory 133 space is defined (S010). Next, a meaning of data in the data area of each device is defined (S011). Next, an update cycle of each data area of the cyclic memory 133 is determined (S012). Then, the determined definition of the address division and the communication cycle are set in each control device 120 and the input/output control device 123 (S013).

The procedures of S010, S011, and S012 may be performed in any order, or may be performed simultaneously. The procedure of S011 may be executed after the procedure of S013.

The address division defines necessary data sizes of the control device 120 and the input/output control device 123, and allocates the data sizes on the address space of the virtual cyclic memory 133. The data sizes of the devices may be equal or different. Each device may be ordered and allocated from the beginning of the address space. The head addresses of the data areas may be arranged at regular intervals.

Figure 12:
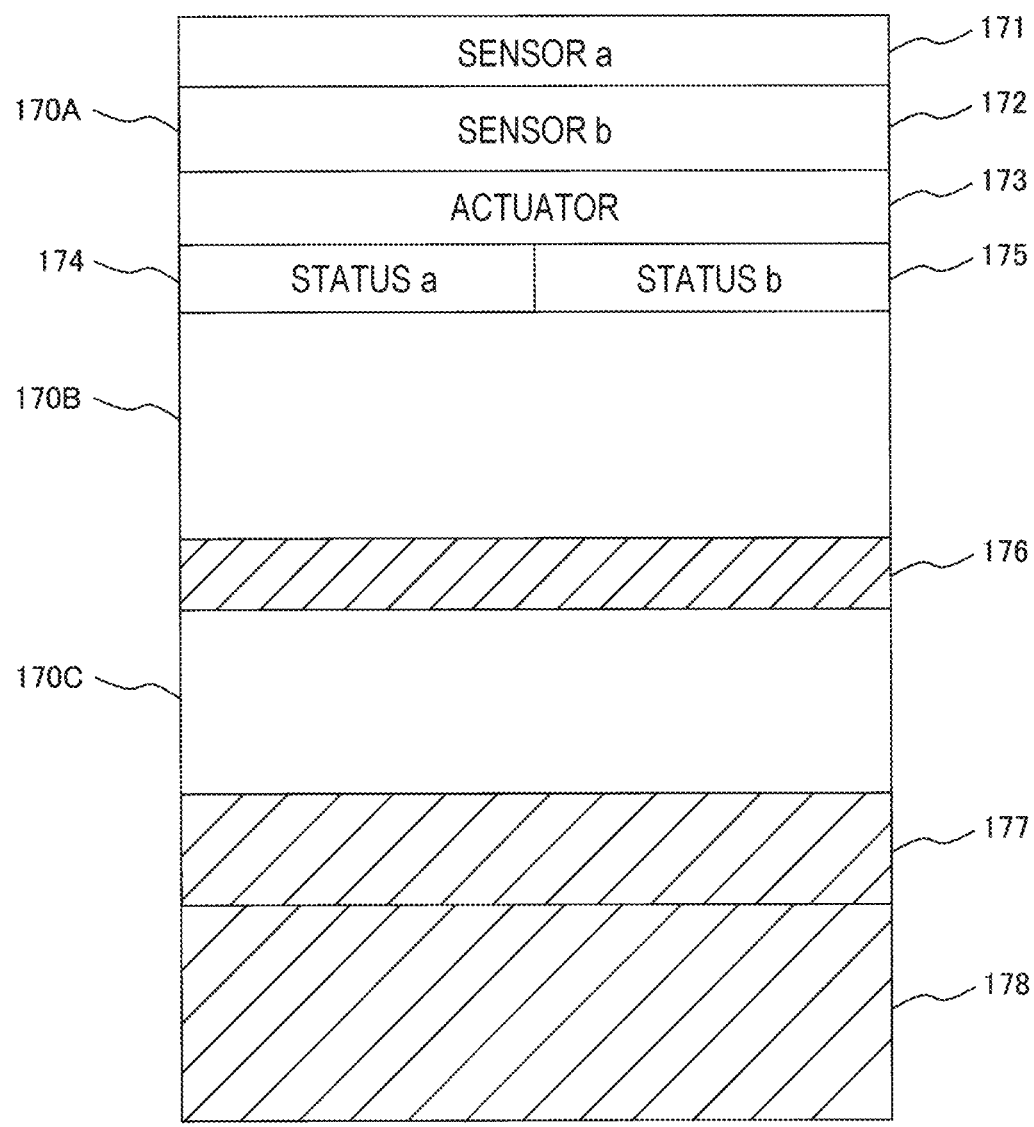
FIG. 12 is a diagram illustrating data allocation in an embodiment of the present invention.

In this case, there may be an undefined area to which data is not allocated depending on the size allocated to the control device 120 or the input/output control device 123 (176 and 177 in FIG. 12). Note that, in a case where there is an access to this undefined area, this may be held as information by software or a register on the CPU 101, and the information may be made accessible from software on the CPU 101. Alternatively, the transmission destination set in advance may be notified by electronic means such as electronic mail, or a web server may be constructed on the CPU 101 so that the transmission destination can be confirmed by being accessed from the outside with a web browser or the like. Physical means such as an LED and an alarm may be presented on the device. By notifying the outside in this manner, the operator can detect that there is an access to the undefined area and review the setting of the cyclic memory 133 such as address division and definition, and as a result, the control system can be easily operated appropriately.

In addition, the update cycle may be different for each device or for each allocated data area.

In addition, S010, S011, S012, and S013 in FIG. 7 may be set and defined in the control device 120 and the input/output control device 123 which are the respective devices before the operation of the control system, or may be dynamically set from the network management device 125 via the control network 122.

(Allocation Example of Cyclic Memory 133)

Here, an example of the allocation of the cyclic memory 133 is illustrated in FIG. 12.

FIG. 12 illustrates the allocation of three devices A, B, and C of the control device 120 and the input/output control device 123. It is assumed that the interval between the head addresses of the device data areas 170 of the respective devices is constant, and the size of the data area actually allocated in each device is different. Therefore, there are undefined areas 176 and 177. An undefined area 178 is an area generated from the relationship between the address width of the cyclic memory and the sum of the data areas of the respective devices.

For example, when 16 bits are defined as the address width of the cyclic memory 133 and one address is one byte, the entire cyclic memory 133 is 64 kbytes (64 kB). Assuming that the interval between the head addresses of the data areas of the respective devices is 20 kbytes, the interval becomes 60 kbytes for 3 devices, and there may be a difference of 4 kbytes as the undefined area 178.

In addition, an example in the device A is illustrated as data allocation in the individual device (the devices B and C are omitted). A sensor a 171, a sensor b 172, an actuator area 173, a status a 174, and a status b 175 are allocated from the head.

When the sensor a 171 and the sensor b 172 are sensor information of the device A, the device A reflects its own sensor value and communicates with another device. Since the actuator area 173 is an output command, the actuator area communicates from a device having a control function to the device A.

The status a 174 and the status b 175 indicate the states of the own device or the other device, for example. The bidirectional relationship between the device A and other devices is exemplified depending on the setting contents such as clear from other devices.

(Network Setting of FIG. 8)

Next, an operation of network setting is illustrated in FIG. 8.

First, a network topology is planned (S020). The number of the control networks 122 and the network relay devices 121 and the connection relationship are determined in consideration of physical restrictions on the arrangement of the controlled devices 124 constituting the control system, conditions on the communication performance between each control device 120 and each input/output control device 123, and the like. Examples of the communication performance between the input/output control devices 123 include a communication bandwidth and path redundancy.

Next, allocation of time slots in each network relay device 121 and the control device 120 is planned (S021). This is determined in consideration of communication requirements in a control application including the control device 120, the input/output control device 123, and the controlled device 124.

Next, a planned time slot is allocated to each network relay device 121, the control device 120, and the input/output control device 123 (S022).

Then, it is determined whether the requirements required for the control system are satisfied (S023). Examples of the requirement here include a requirement of reliability based on whether a time constraint such as a communication delay, a control cycle, and a communication cycle can be satisfied, a redundancy of a communication path, and retransmission.

In addition, it is exemplified that a plurality of control systems and control applications configured on the control network 122 are constructed. Then, the determination in S023 is exemplified to satisfy the requirements (for example, all) of each application or satisfy the requirements of some applications selected on the basis of the priority.

When the requirement is satisfied in S023 (Y in S023), the process ends. Alternatively, when the requirement is not satisfied (N in S023), the process is executed again from S020.

Here, it has been described that the network topology and the time slots are allocated in consideration of the requirements in S020 and S021. However, planning may be performed using a search method or an optimization method, and search for an appropriate value of each parameter in the network setting may be repeated until the requirement is achieved in S023.

(Operation Procedure: Output)

Next, an operation procedure of output control in the input/output control device 123 is illustrated in FIG. 9. First, reception of a packet of an output command is waited (S030). When the packet of the output command is received (Y in S030), the control command value and the information stored in the packet or the packet are stored in a reception buffer (S031). Note that this reception buffer is constituted by any one or a plurality of memories of the memory 104, the nonvolatile storage medium 105, and the internal memory of the communication control IC 102, and the functional unit is held by any one or both of the communication unit 131 and the cyclic memory synchronization update unit 132.

Next, an interrupt generated at time t_mem_out is waited (S032). The generation timing of the interrupt will be described later with reference to a time chart in FIG. 13. This interrupt is notified from the time management unit 136.

After the interrupt occurs (Y in S032), the cyclic memory synchronization update unit 132 reflects the content of the received packet in the cyclic memory 133 (S033). The received packet itself may be reflected in the cyclic memory 133, or the control command value included in the received packet may be extracted and reflected. Alternatively, information shaped according to a predetermined rule may be reflected. Such rules include a change of a data format with respect to the reception content (change from raw data value to XML, change from integer type to floating decimal point type, change from character string to numerical value, etc.), statistical processing (average, minimum value, maximum value, etc., from the contents received so far), filter operation, and the like.

Thereafter, the interrupt generated at the time t_out is waited (S034). This is an interrupt notification from the time management unit 136 to the calculation scheduling unit 135.

When an interrupt is generated (Y in S034), the calculation scheduling unit 135 activates the input/output control unit 137. Here, the input/output control unit 137 reads the control command value updated in the cyclic memory 133, and controls the input/output unit 107 to output a signal (S035).

Specifically, this is an output command to an actuator such as a motor, a cutoff command to a circuit breaker, or the like.

Next, it is determined whether an end condition is satisfied (S036). When the condition is satisfied (Y in S036), the process ends, and if not (N in S036), the process is repeated from S030. Examples of the end condition include satisfaction of a predetermined control target by the control system, occurrence of abnormality in the control system, execution for a predetermined operation time, execution for the number of executions, elapse of a predetermined time, and receipt of an explicit end instruction from an operator or the like.

Although it has been described that S030 to S031 and S032 to S036 operate continuously, they may be executed in parallel. In such a case, when the end condition is not satisfied in S036 (N in S036), S030 and S032 are repeated.

(Operation Procedure: Input)

Next, an operation procedure of input in the input/output control device 123 is illustrated in FIG. 10.

First, an interrupt generated at time t_in is waited (S040). This is an interrupt notification from the time management unit 136 to the calculation scheduling unit 135. If an interrupt is generated (Y in S040), the calculation scheduling unit 135 activates the input/output control unit 137, and the activated input/output control unit 137 inputs sensor information from the input/output unit 107 (S041).

The input sensor value is stored in a buffer (S042). Note that this buffer is held by the input/output control unit 137 as a functional unit, and is realized by using any one or a plurality of the memory 104, the nonvolatile storage medium 105, and the internal memory of the communication control IC 102 as hardware.

Next, the interrupt generated at the time t_send_in is waited (S043). This is a notification of interrupt from the time management unit 136 to the cyclic memory synchronization update unit 132. If an interrupt is generated (Y in S043), the cyclic memory synchronization update unit 132 reads the sensor information stored in the buffer in S042. The information read therefrom is transmitted as a packet to the control network 122 (S045). This is, for example, broadcast or transmission to a predetermined transmission destination.

Next, an interrupt generated at time t_mem_in is waited (S046). If an interrupt is generated (Y in S046), the stored sensor value is stored in the cyclic memory 133 (S047). The sensor value itself may be reflected in the cyclic memory 133, or information shaped according to a predetermined rule may be reflected. Examples of the rule include a change of a data format with respect to the reception content (change from raw data value to XML, change from integer type to floating decimal point type, change from character string to numerical value, etc.), statistical processing (average, minimum value, maximum value, etc., from the contents received so far), filter operation, and the like.

Next, an end condition is determined (S048). The determination condition is similar to S036 in FIG. 9. When the end condition is satisfied (Y in S048), the process is ended, and when the end condition is not satisfied (N in S048), the process is repeated from S040.

Note that S040 to S042, S043 to S045, and S046 to S048 have been described as continuous procedures, but may be executed in parallel. In this case, when the end condition is not satisfied in S048 (N in S048), the process returns to a waiting process (S040, S043, S046) at the beginning of each series of procedures.

(Operation Procedure: Control Procedure)

Next, a control procedure is illustrated in FIG. 11. First, reception of a packet storing information for performing control calculation such as a sensor value and state information is waited (S050). When the packet is received (Y in S050), the received information is stored in a buffer. Note that this buffer is held by the cyclic memory synchronization update unit 132 as a functional unit, and is realized by using any one or a plurality of the memory 104, the nonvolatile storage medium 105, and the internal memory of the communication control IC 102 as hardware.

Next, an interrupt generated at time t_mem_cnt_in is waited (S052). If an interrupt is generated (Y in S052), the information stored in the buffer is stored and reflected in the corresponding area of the cyclic memory 133 (S053). In this case, one or a plurality of pieces of information in the buffer may be stored in one or a plurality of data areas on the cyclic memory 133. The same data may be stored in a plurality of data areas.

Next, an interrupt generated at the time t_cnt is waited (S054). When the interrupt is generated (Y in S054), the control command value is calculated according to a predetermined control calculation algorithm using the information of the cyclic memory 133 (S055). As the control calculation algorithm used at this time, control laws such as feedback control and feedforward control are exemplified as long as control of an industrial robot, a belt conveyor, a servo motor, and the like is a target based on a control function to be realized by a control system. Alternatively, the control command value may be a control command value corresponding to each state (state) on the basis of a state transition (Finite State Machine (FSM)). Alternatively, as in a current differential protection method in protection control in the field of power monitoring control, the presence or absence of an accident is determined according to the Kirchhoff rule using held information as a current value observed by a protection relay, and as a result, a cutoff command to a circuit breaker is calculated.

Next, the calculated control command value is stored in a buffer (S056). The buffer is held by the cyclic memory synchronization update unit 132 as a functional unit, and is realized by using any one or a plurality of the memory 104, the nonvolatile storage medium 105, and the internal memory of the communication control IC 102 as hardware.

Next, an interrupt generated at the time t_send_cnt is waited (S057). When an interrupt is generated (Y in S057), the buffer information stored in S056 is transmitted to a predetermined communication partner or the control network 122 (S058).

Next, an interrupt generated at the time t_mem_cnt_out is waited (S059).

If an interrupt is generated (Y in S059), the information stored in the buffer in S056 is reflected in the cyclic memory 133 (S060).

Then, an end condition is determined (S061). The end condition is equivalent to S036 and S048. When the end condition is not satisfied, the procedure of S050 is repeated.

Although it has been described that each procedure of S050 to S051, S052 to S053, S054 to S056, S057 to S058, and S059 to S060 is continuously executed, one or a plurality of these procedures may be executed in parallel. For example, S050 to S051 and S052 to S061 may be executed in parallel, or other steps may be included and executed in parallel. Alternatively, S050 to S051, S052 to S058, and S059 to S061 may be executed in parallel. When each parallel operation does not satisfy the end condition of S061, the process returns to the waiting process (S050, S052, S054, S057, S059) at the beginning of each procedure.

Note that the sensor information targeted in S050 to S051 may be plural. That is, S050 to S051 are activated as tasks for each input/output control device 123 as a transmission source, and data is stored on a distributed area on the cyclic memory 133 for each input/output control device 123 as a transmission source.

Similarly, in the calculation of the control command values in S054 to S058, the calculation of the control command values to the plurality of input/output control devices 123 is targeted, and S054 to S058 are activated as tasks for each input/output control device 123 of the transmission destination. Then, for each input/output control device 123 of the transmission destination, the control command value is stored on a distributed area on the cyclic memory 133.

In addition, although the packet is transmitted in S060 after waiting for the interrupt in S059 and S057 after calculating the control command value in S055, one or both of S059 and S057 may be omitted and the packet may be transmitted without waiting for the interrupt.

Although FIGS. 9, 10, and 11 illustrate the configuration in which the sensor device, the actuator, and the control device (controller) are separated, one or a plurality of functions of input, control, and output may be realized on one device.

(Time Chart)

Figure 13:
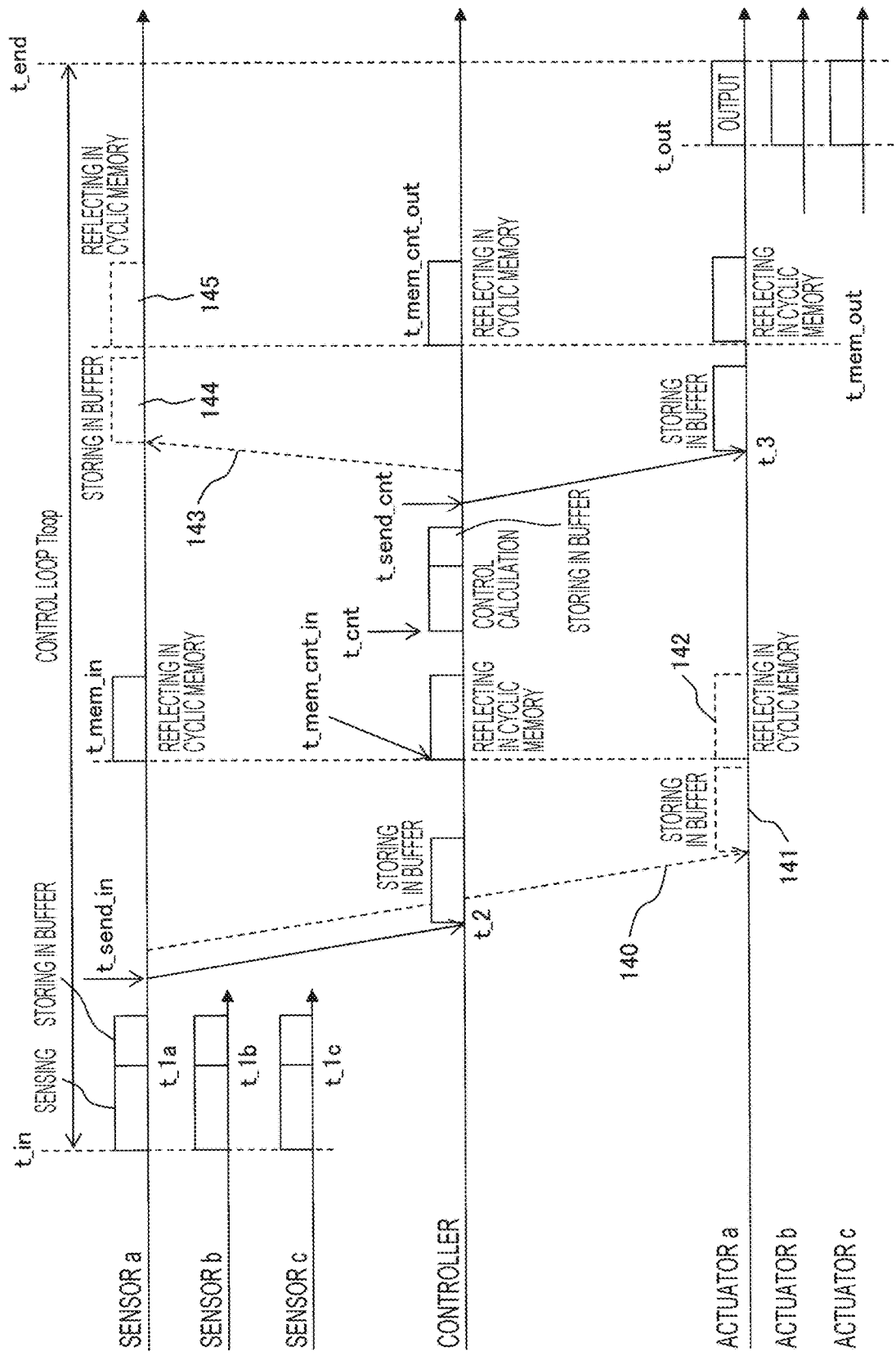
FIG. 13 is a diagram illustrating a time chart according to an embodiment of the present invention.

FIG. 13 is a time chart illustrating operations illustrated in FIGS. 9, 10, and 11.

A time chart of a plurality of sensors, a controller, and a plurality of actuators is illustrated.

Note that the second and subsequent sensors are illustrated only around the input timing, and the second and subsequent actuators are illustrated only around the output timing.

At t_in (S040 in FIG. 10), the input/output control device 123 serving as a sensor is activated by interrupt and performs sensing. Thereafter, the sensor values are stored in the buffer at t_1a, t_1b, and t_1c (S042 in FIG. 10). That is, t_in is set to the same time among the plurality of sensors.

Note that since the sensing times may be different among the sensors 1, 2, and 3, t_1a, t_1b, and t_1c are not necessarily the same time.

Thereafter, at t_send_in, each sensor transmits the buffer information to another device (S043 and 5044 in FIG. 10).

In this case, the transmission destination of the sensor information is not limited to the controller (control device 120), and the sensor information may be transmitted to another sensor or another actuator (140 and 141 in FIG. 13) in order to synchronize the cyclic memory 133 (transmission to another sensor is not illustrated).

Note that there may be a plurality of controllers and actuators to be transmitted. In addition, the transmission time t_send_in of the input/output control device 123 to be each sensor device is planned in S021 in FIG. 8, and can be different from each other.

The device received at t 2 stores the information in a buffer (S050 and S051 in FIG. 11, and no description in FIGS. 9 and 10). Thereafter, the information stored in the buffer is reflected in the cyclic memory 133 in each device at t_mem_in and t_mem_cnt_in. That is, t_mem_in and t_mem_cnt_in are set to the same time. The actuator may also be reflected in the cyclic memory 133 (142 in FIG. 13).

Next, at t_cnt, control calculation (S054 and S055 in FIG. 11) is performed and stored in the buffer (S056 in FIG. 11).

Thereafter, transmission is performed to another device at t_send_cnt (S057 and S058 in FIG. 11). In this case, the transmission destination is not limited to the actuator, and may be another sensor (143 and 144 in FIG. 13) or another controller (not illustrated). A plurality of sensors and controllers may be used as the transmission destination. The device received at t_3 stores the reception content in the buffer (S030 and S031 in FIG. 9).

Next, at t_mem_cnt_out and t_mem_out, the content stored at t_3 is reflected in the cyclic memory 133 (S032 and S033 in FIG. 9, and S059 and S060 in FIG. 11). Note that t_3 may be different for each receiving device. That is, t_mem_cnt_out and t_mem_out are set to the same time. In this case, in order to synchronize the cyclic memory 133, the reception content may be reflected in the cyclic memory 133 also in the sensor device (145 in FIG. 13).

Next, at t_out, the actuator makes an output based on the received command value (S034, S035 in FIG. 9). That is, tout is set to the same time among the plurality of actuators.

In this way, since the sensor acquisition timings are synchronized among the plurality of sensors, the environmental information at the same time can be acquired even if the devices are physically separated via the network in the entire control system. As a result, in the control system design based on the control theory, the timing of taking in each sensor is not different, and thus, it is possible to reduce an error from the design value. As a result, the control performance can be improved as compared with the related art. In addition, in realization of a simulation or a digital twin that reproduces a control system in a cyberspace on the basis of acquired information, sensor information with higher accuracy and high quality can be handled, so that the accuracy of the configuration of the simulation and the digital twin can be improved. As a result, the control system design and operation of the control system can be easily advanced and improved in performance.

Further, by synchronizing the output timings of the plurality of actuators, the output timings of the actuators do not vary in the control system design based on the control theory, so that an error from the design value can be reduced.

Note that the control calculation and the buffer storage at t_cnt in FIG. 13 may be continuously executed from the reflection to the cyclic memory 133 at previous t_mem_cnt_in, or the transmission at t_send_cnt may be continuously executed from the buffer storage at t_cnt.

Further, the following can be performed by synchronizing the update of information to the cyclic memory 133 at the timing of t_mem_in (t_mem_cnt_in) and t_mem_out (t_mem_cnt_out). That is, the contents of the cyclic memory 133 in each device (the input/output control device 123 and the control device 120) can be the same or similar. As a result, the control system as a whole can operate on the basis of the common and same sensing information, a control calculation result, and an output command, and the control system can be operated as designed, and thus, it is possible to improve the advance, the accuracy, and the performance.

In addition, the communication bandwidth can be efficiently utilized by performing communication only in a predetermined time slot and time zone.

Note that the following processing is performed to make t_in, t_mem_in, t_mem_cnt_in, t_mem_out, and t_mem_cnt_out of FIG. 13 common in the control system. In each device, one or more of the start time of a control loop Tloop, the length of the control cycle Tloop, and the time offsets of t_in, t_mem_in, t_mem_cnt_in, t_mem_out, and t_mem_cnt_out from the start time of each control cycle are shared on the basis of the synchronized time system.

This sharing method may be preset in each device before the control system is operated, or may be set by a system operator, a designer, or a user online by the network management device 125 or the like.

(Relationship Between Generation Time and Use Time)

Note that the sensor information and the calculated control command is configured to store the generated and calculated time on the communication packet. Alternatively, the number of executions of the control loop of FIG. 13 may be associated with the parameter on the communication packet so that the timing at which the information is generated can be detected. For example, the number of executions of the control loop from the start of operation of the control system is included in the communication packet (for example, the sequence number of the protocol header).

In this manner, the method of using the data can be controlled by observing the generation timing of the command. For example, the data is used to determine earlier arrival or later arrival in the case of a redundant packet which is discarded when an elapsed time from generation is longer than a predetermined threshold and can be determined as old data, or with which the state of the control system is estimated on the basis of the elapsed time.

(Redundancy)

Figure 14:
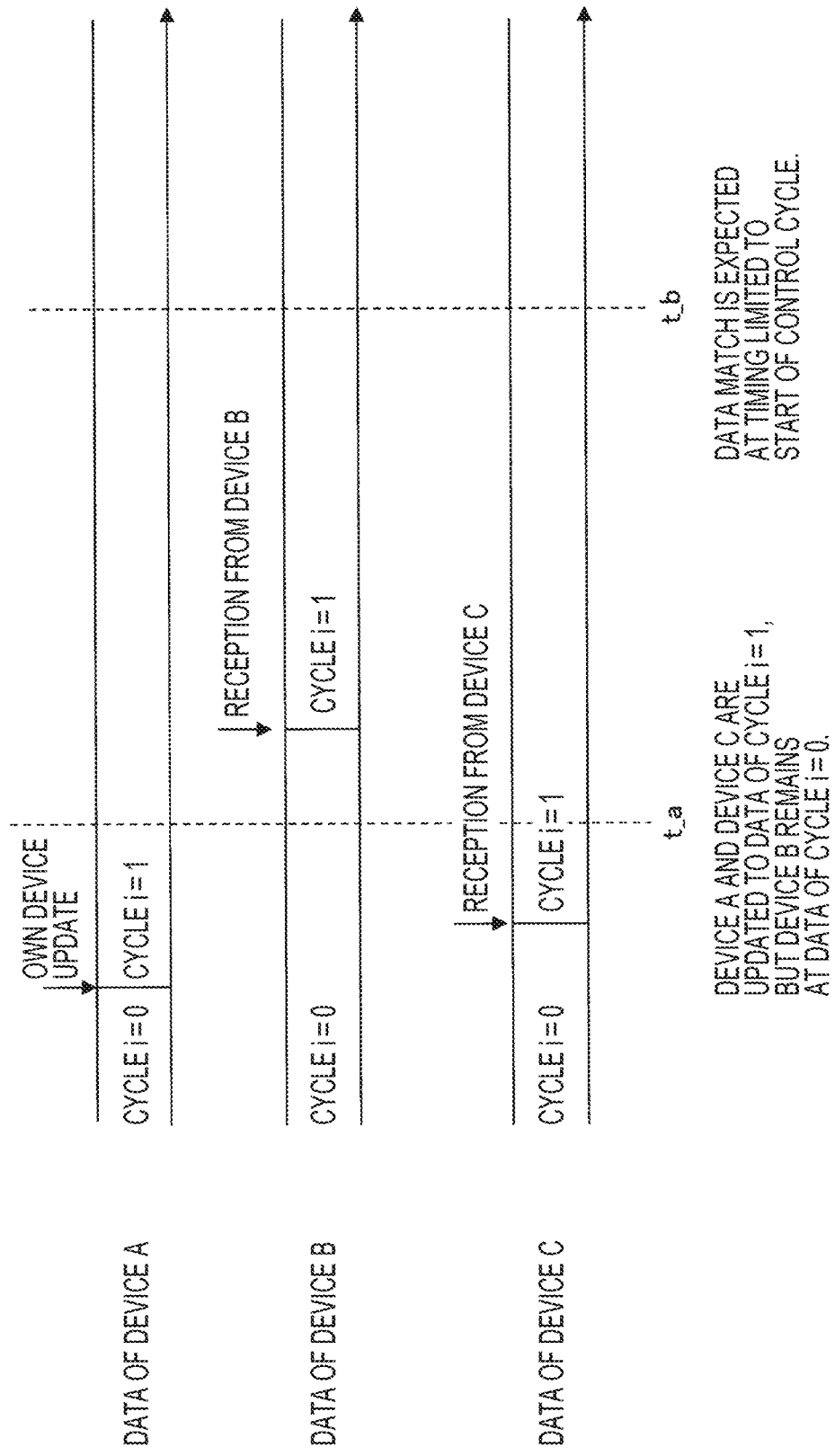
FIG. 14 is a diagram illustrating a timing of data update in a device according to an embodiment of the present invention.

In addition, since the contents of the cyclic memory 133 are the same for each device at the same time timing, the following configuration can be adopted. Conventionally, since the cyclic memory 133 is updated at the timing when each device receives the packet, there is a restriction on the operation timing of the task in each control device 120 and the input/output control device 123. That is, information held between the devices may be different depending on task execution timing, and thus performance of the entire control system is deteriorated (t_a in FIG. 14). Alternatively, there is a constraint that the task has to be executed at a timing (t_b in FIG. 14) at which information is considered to be reliably synchronized between the devices in consideration of a time synchronization error between the devices. The latter has a problem that efficient use of computer resources is limited because execution timing of a task is restricted.

Figure 15:
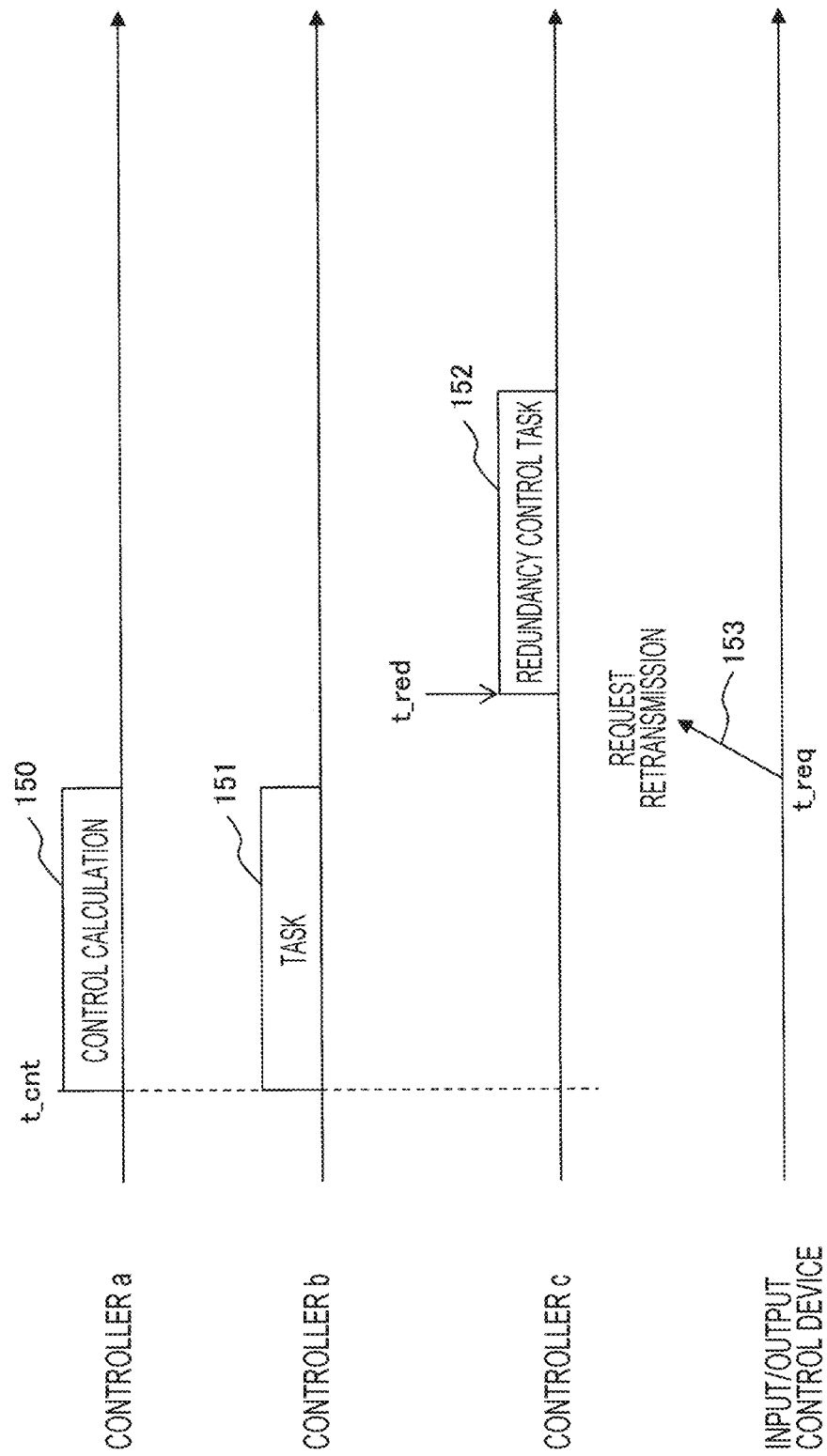
FIG. 15 is a diagram illustrating a time chart according to an embodiment of the present invention.

According to the present embodiment, since the contents of the cyclic memory 133 are common and consistent at any timing, the task can be scheduled as illustrated in FIG. 15. This shows an operation focusing on the controller (control device 120). At t_cnt in FIG. 13, while a controller a executes a control calculation 150, another controller b can execute another task 151 (for example, AI inference processing, state monitoring, preventive maintenance, and the like based on the sensor input value).

Further, in the different controller c, at t_red, the same content as that of the control calculation 150 is executed as a redundancy control task 152 in order to be redundant. Since the contents of the cyclic memory 133 are synchronized, the redundancy control task 152 can be executed at an arbitrary timing, and may be executed at t_cnt, for example. Further, in a case where the input/output control device 123 that is scheduled to receive the calculation result of the control calculation 150 or the task 151 has not received the calculation result at t_req, execution and retransmission can be requested to the target controller (153).

For convenience of description, the control calculation 150, the task 151, and the redundancy control task 152 have been described separately from the controllers a, b, and c, but controllers that execute a plurality of tasks may be integrated.

For example, the controller a may execute the control calculation 150 and the redundancy control task 152, and the controller b may execute the task 151 and the redundancy control task 152.

In addition, for example, the timing t_req of transmitting a retransmission request of 153 is set by the time management unit 136 after the timing of receiving the first command value of the control calculation 150. Further, in order to make the cyclic memory 133 the same at t_mem_out, it is exemplified that t_red and t_req are set before t_mem_out.

For example, S021 and S022 in FIG. 8 are planned based on these time constraints and communication delays (transfer of output command from 153 and the redundancy control task 152). Note that a configuration is exemplified in which the control calculation 150, the task 151, and the redundancy control task 152, which are tasks, hold calculation results so that retransmission can be immediately performed at the time of retransmission request.

Figure 16:
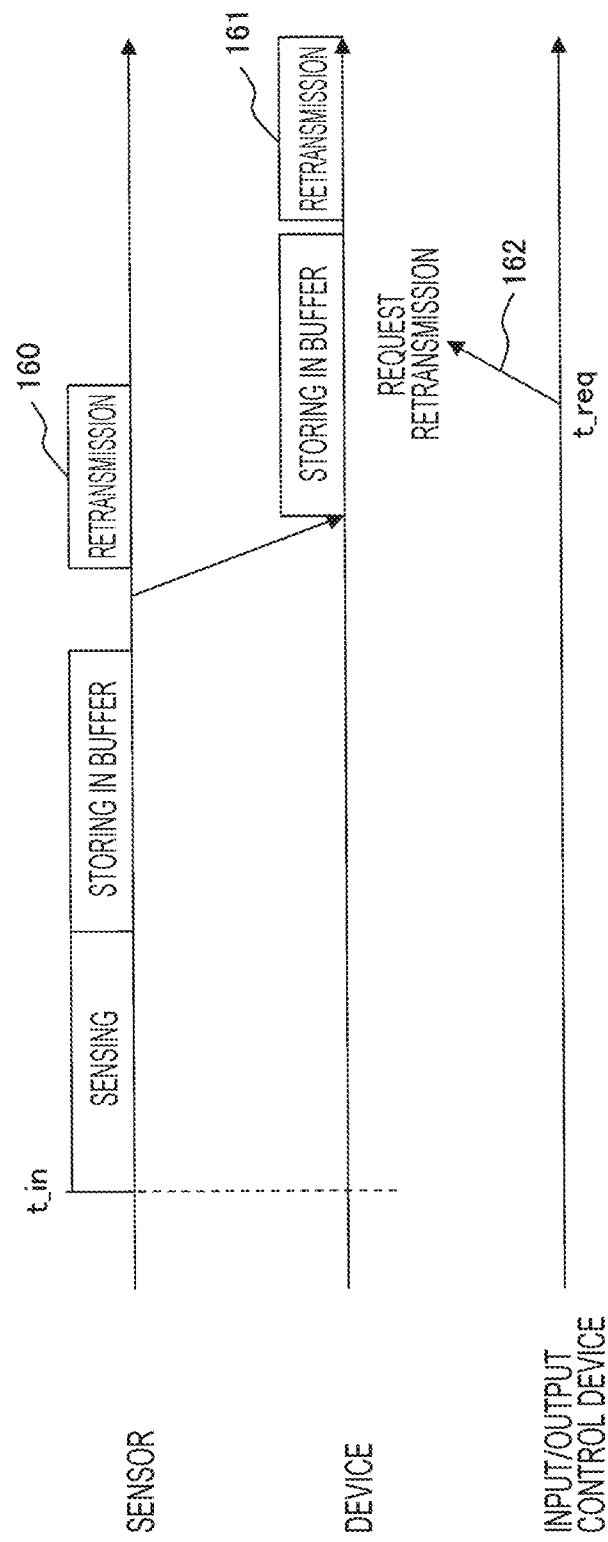
FIG. 16 is a diagram illustrating a time chart according to an embodiment of the present invention.

(Input-Side Redundancy in FIG. 16)

Next, a redundancy process of the input example is illustrated in FIG. 16.

After the sensor fetches the sensor information at t_in and stores the sensor information in the buffer, the sensor information may be transmitted to another device, and then the sensor information may be retransmitted (160). This may be retransmitted from another device that has received the sensor information (161). In addition, the retransmission request may be transmitted from a controller or another device that is to receive sensor information (162).

In addition, for example, the timing t_req of transmitting a retransmission request of 162 is set by the time management unit 136 after the timing of receiving the first sensor information. Further, in order to make the cyclic memory 133 the same at t_mem_in, setting t_red and t_req before t_mem_in is exemplified.

For example, S021 and S022 in FIG. 8 are planned based on these time constraints and communication delays (162, transfer of sensor information). Note that a configuration in which each task holds sensor information so that retransmission can be immediately performed at the time of retransmission request is exemplified.

(Reception Side of Redundant Communication)

Regardless of the types of the sensor, the controller, and the actuator in FIG. 13, a plurality of methods can be considered in selecting a plurality of received packets on the reception side.

For example, a first-come, first-served priority of adopting the first received packet, or a post-come, first-served priority of adopting the last packet received before the closing time (for example, t_mem_in and t_mem_cnt_in for reception of sensor information) is exemplified.

Alternatively, a priority may be set to a packet on the basis of a state and an attribute related to communication such as a transmission source device and a transmission time zone, and a packet to be adopted may be selected on the basis of the priority. Alternatively, in a case where a plurality of packets is received, a result of applying statistical processing to a plurality of pieces of received information may be adopted. Examples of such a case include use of an average of sensor information.

(Effect of Redundancy)

With the above configuration, the sensor information, the arithmetic processing of the control calculation, and the input/output processing can be made redundant, and the performance of the control system can be improved. That is, by providing a plurality of input/output control devices 123 serving as sensors and actuators, redundancy can be achieved in output processing, and high reliability can be achieved.

By providing redundancy through such communication, hardware or software that realizes a selection function and a switching function in redundancy can be omitted. For example, in hardware, it is not necessary to provide two communication ports in redundancy of control commands and communication of sensor devices.

In addition, in software, the cyclic memory synchronization update unit 132 selects a packet for updating the cyclic memory 133, so that the master control application does not need to be aware of redundancy of communication. As a result, the conventional application can be reused as it is without any change or modification.

Further, since there is no restriction on the execution timing of a task, an application for an arbitrary distributed control system can be executed at an arbitrary timing, and the computer resources constituting the distributed control system can be efficiently used. Consequently, necessary computer resources (control device 120) can be minimized, and the distributed control system can be constructed at low cost.

(Phase Shift Control)

Figure 17:
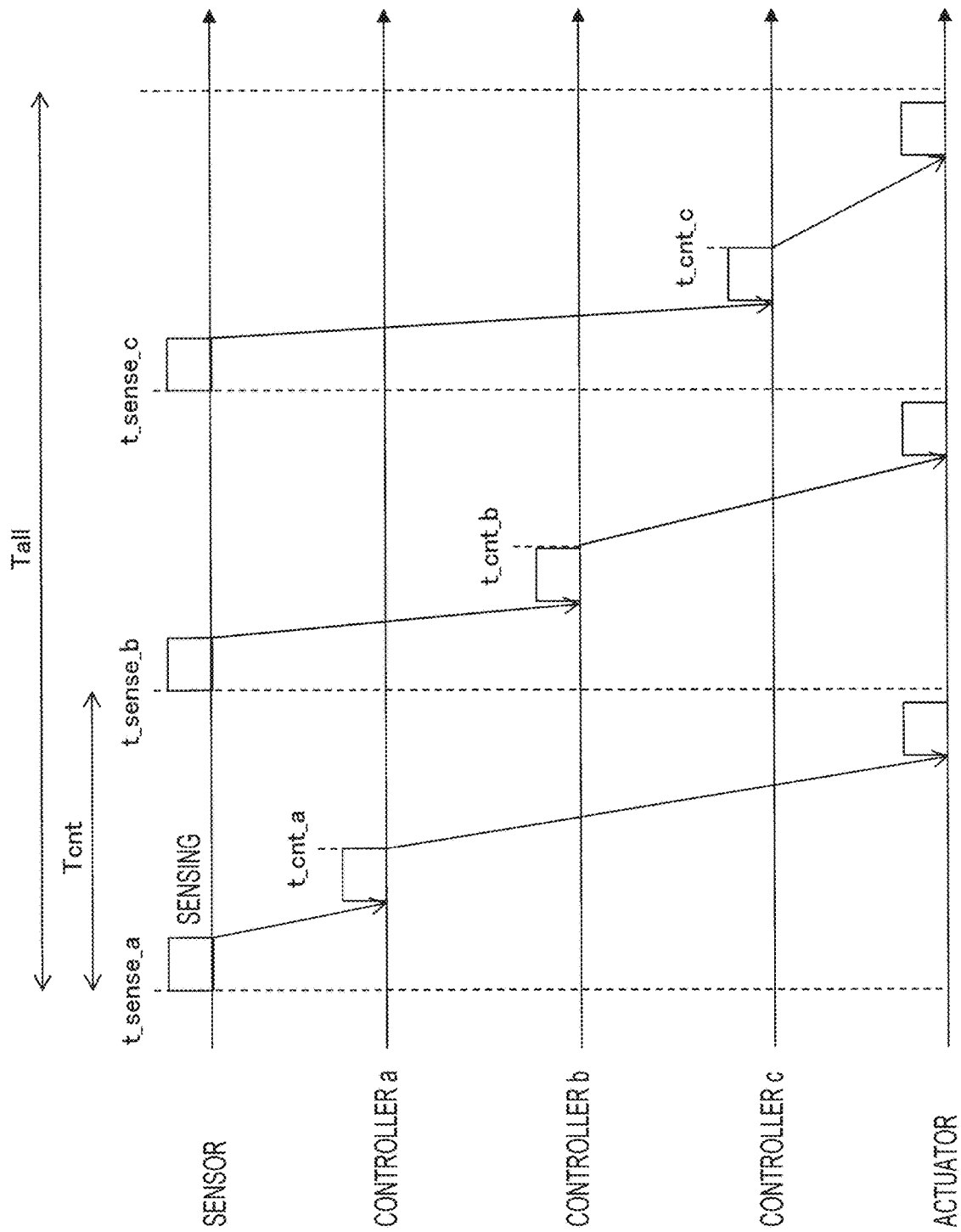
FIG. 17 is a diagram illustrating a time chart according to an embodiment of the present invention.

Next, FIG. 17 illustrates an example in which a plurality of controllers are provided and phases of control calculation and command output are shifted to improve control performance.

In the configuration of FIG. 17, there are one sensor (input/output control device 123), three controllers (control device 120), and one actuator (input/output control device 123).

In this configuration, the timing of command output is shifted using a plurality of controllers. That is, a time difference is provided in the command output (output of the command value) in different controllers. In this way, by providing the time difference, it is possible to speed up the apparent control cycle and improve the performance of the entire control system as compared with the case of performing control by the controller alone. As described above, when a time difference is provided in the control command, the timing of performing the control calculation (calculation of the command value) may be shifted as follows. That is, at least one of them may be shifted. Further, the number of controllers is not limited to three.

The sensor transfers the information acquired by t_sense_a to the controller a, and the controller a outputs a control command at t_cnt_a. Similarly, the sensor transfers the information acquired at t_sense_b to the controller b, the controller b outputs the control command at t_cnt_b, the information acquired at t_sense_c is transferred to the controller c, and the controller c outputs the control command at t_cnt_c.

Note that, in a case where the sensor and the controller do not correspond to each other on a one-to-one basis, and the control calculation is performed at different timings, the state or the environment model of the control system may be estimated in the elapsed time from the acquisition time of the sensor.

As a result, even if the operation in the period Tall is limited in the single controller, the control cycle in the control system can be shortened to Tcnt that is 3 times faster (the controller b of FIG. 17).

With this configuration, it is possible to vary, adjust, and speed up the control performance by changing the number of controllers up to the control cycle that can be followed by the sensor and the actuator.

Since this configuration can be adjusted by the controller connected to the control network 122, the controller configuration can be flexibly changed according to the required performance of the control system.

Therefore, the control system can be appropriately designed from the cost requirement and required performance of the control system. In addition, the control performance can be easily adjusted after the start of the operation of the control system by adjusting the number of controllers when the control performance becomes necessary or unnecessary during the operation of the control system.

Note that a plurality of sensors and actuators may be provided. In FIG. 17, the number of sensors may be three, and the sensor information may be transmitted to the corresponding controller in each cycle Tall (for example, from the sensor a to the controller a). Alternatively, the sensor information may be transmitted to each controller for redundancy.

With such a configuration, when a surplus of computer resources (for example, CPU resources) is generated, the computer resources can be allocated to other tasks such as AI processing, monitoring diagnosis, preventive maintenance, and remaining life diagnosis of the controlled device 124. As a result, the performance of the entire control system can be improved, and the reliability can be increased.

(Mixing and Switching of Redundancy and Phase Shift Control)

Note that, in a case where a plurality of controllers is used, the redundant configuration illustrated in FIG. 15 and the speeding up by the phase shift of FIG. 17 may be used dynamically and statically depending on the situation.

This may be explicitly specified by the operator of the control system as to which mode to operate, or may be switched when a predetermined time has come or when a predetermined operation period has elapsed.

Alternatively, switching may be performed on the basis of deviation information of the control system obtained by the sensor information.

For example, when the deviation from the target value is large, it is considered that the control performance is insufficient, and the number of controllers by the phase shift is increased.

In the redundant configuration and the phase shift, the number of controllers can be further adjusted, and the redundant configuration and the phase shift can be mixed. Therefore, the following control is exemplified based on the attribute (time timing, operation period, operator instruction, operation, control system deviation, etc.) of the above control system. For example, it is exemplified to control which controller (sensors, actuators may be included) is operated in which of the phase shift and the redundant configuration, and which controller is included in the same group when the same operation is performed in the phase shift and the redundant configuration.

As a result, the number of controllers operating in the redundant configuration and the phase shift control under specific conditions can be flexibly controlled according to the control system requirements.

Note that these adjustments may be set and controlled online like a software defined network (SDN) via the network management device 125.

(Timing Adjustment of Synchronous Interrupt According to Variation of Processing Time for Each Node)

Note that regarding the timing of interrupt of each device illustrated in FIG. 13 and the like, the timing of interrupt may be adjusted for each device in consideration of the processing time in each device. For example, description will be made using a sensor input.

Figure 18:
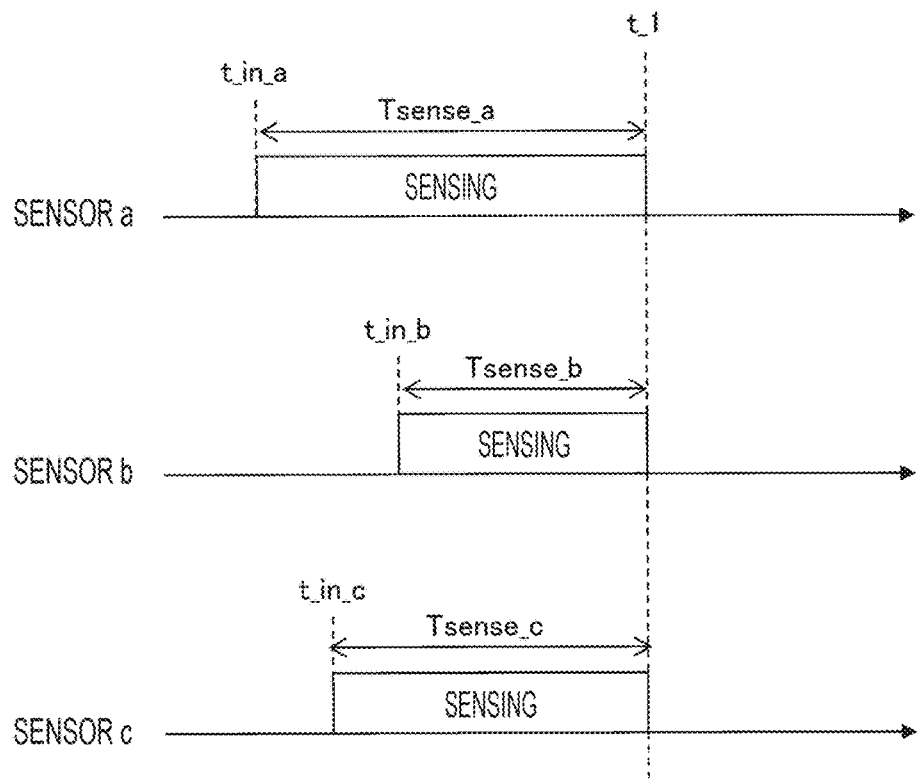
FIG. 18 is a diagram illustrating a time chart according to an embodiment of the present invention.

In FIG. 13, it is assumed that the processing time of the sensor input is the same for the sensors a, b, and c, and the start of the sensor input processing is the same time t_in. For example, FIG. 18 illustrates a case where the processing times of the sensors are different from each other and the end time of the sensor processing is synchronized. In this example, the sensor processing times Tsense_a, Tsense_b, and Tsense_c are different for the respective sensors and the interrupt timings t_in_a, t_in_b, and t_in_c are shifted for the respective sensors in order to synchronize t_1. Thus, the sensor end timing can be synchronized.

Examples of the interrupt whose timing can be adjusted in this manner include t_in, t_mem_in, t_mem_cnt_in, t_cnt, t_mem_out, t_mem_cnt_out, and t_out in FIG. 13.

As factors that cause such differences in processing time, differences in application processing time, communication protocol stack, and OS of each device, and differences in the input/output unit 107 are exemplified. In addition, in a case where there is a fluctuation in these processing times, a configuration is exemplified in which the interrupt timing is set using the worst value, and when the processing ends earlier than the worst value, the device stands by.

(Packet Opening Time)

The operation timing of each device is controlled by the calculation scheduling unit 135 and the time management unit 136 at the timing of interrupt within a cycle. However, the packet storing the operation start time may be transmitted from the control device 120, the input/output control device 123, and the network management device 125 to the target device, and the received device may start the operation at the operation start time of the packet.

Such a packet has at least an operation start time based on a time synchronized in the control system, and may include an operation type (for example, acquisition of a sensor value, control calculation, actuator output, and start of a predetermined task).

Alternatively, the operation end time may be used instead of the operation start time. For example, the received device calculates the start time based on the operation end time on the packet and the processing time of the processing, and starts the processing at the start time. In this configuration, since each device can determine the operation start time based on the device-specific processing time, the device that transmits the packet does not need to know the information specific to the individual device, and the target processing can be easily synchronized.

With the above configuration, the operation and the processing timing can be controlled from the outside, so that the control cycle can be dynamically changed and appropriately controlled in accordance with the state of the control system. For example, in a case where a processing device is taken as an example, the following can be performed. When the machining accuracy required for the target workpiece is high or the shape is complicated, the control cycle can be shortened to improve the control performance. On the other hand, when the machining accuracy required for the target workpiece is low or the shape is simple, the control cycle is lengthened to lower the control performance, and energy (power consumption and the like) required for executing the control system can be saved.

(Influence of Time Synchronization)

In the present embodiment, the timing of processing is controlled on the basis of time synchronization using a communication protocol such as IEEE 1588, GPS, or the like. Therefore, for example, by observing the output timing of the actuator of a certain input/output control device 123 and obtaining the cycle, the cycle becomes Tloop of FIG. 13.

Here, when erroneous time information is provided in the execution of the IEEE 1588 protocol, the output timing of the input/output control device 123 is shifted by an erroneous time. This is illustrated in FIGS. 19(a) and 19(b).

Figure 19A:
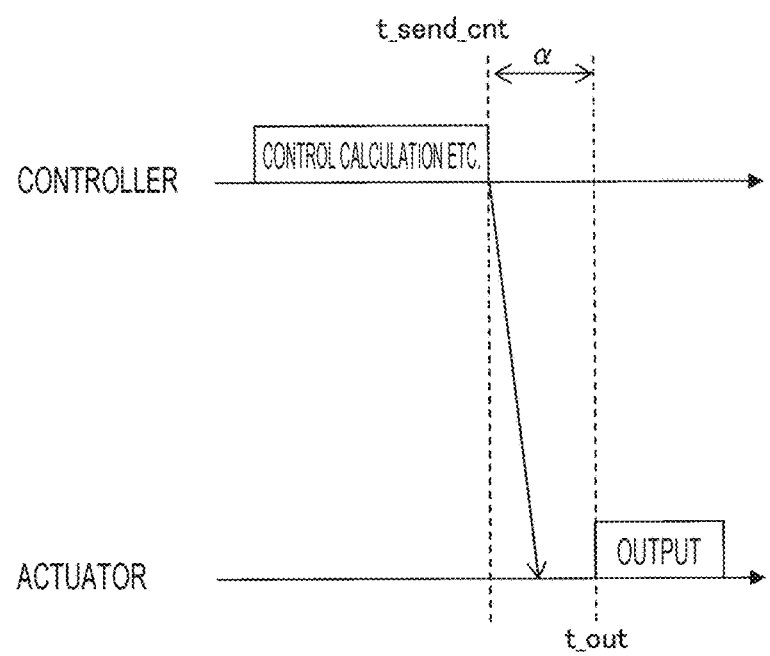
FIG. 19(a) is a diagram illustrating a time chart according to an embodiment of the present invention.

FIG. 19(a) illustrates a state in which synchronization can be normally performed. When viewed in an event observable from the outside, a control command is output from the controller at t_send_cnt, and a difference between t_out and t_send_cnt is α.

Figure 19B:
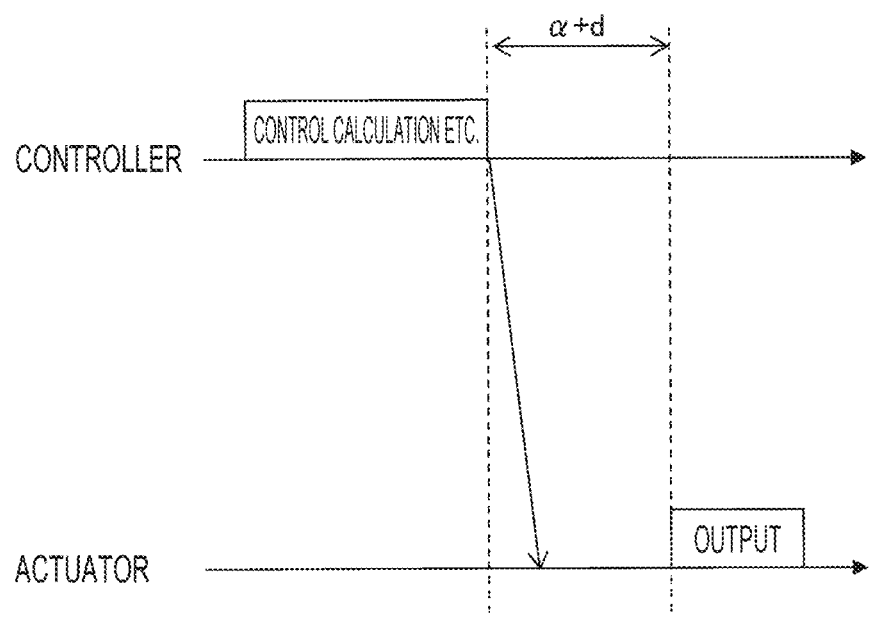
FIG. 19(b) is a diagram illustrating a time chart according to an embodiment of the present invention.

Here, in a device that executes a synchronization protocol with the input/output control device 123 (not limited to the controller of FIGS. 19(a) and 19(b)), if the time of the actuator is delayed by d due to erroneous time information, the output timing is delayed (FIG. 19(b)).

Note that examples of the incorrect time information include setting a time stamp of Sync to an incorrect value and setting a time stamp of Pdelay_Resp or Pdelay_Resp_Follow_Up of the peer delay mechanism to an incorrect value.

As a method of impersonating the time stamp, for example, by setting the time earlier by a value of 2×d with the time stamp of the Sync message of IEEE 1588, the time of the input/output control device 123 serving as the actuator can be delayed by d.

(Hierarchization)

Figure 20:
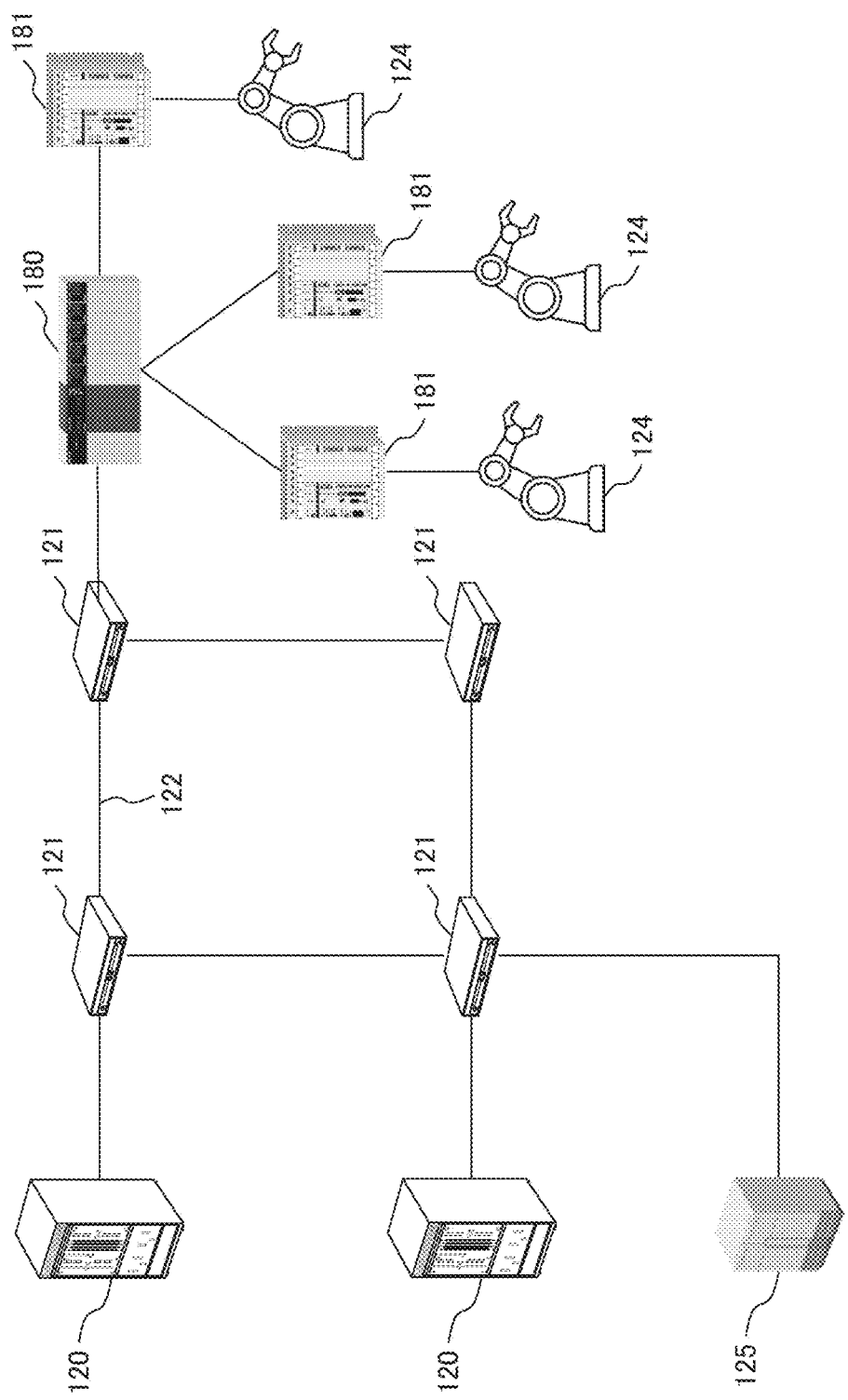
FIG. 20 is a system configuration diagram using an embodiment of the present invention.

Next, an example in which the input/output control device 123 of the present embodiment is replaced and the control system is hierarchized is illustrated in FIG. 20.

Figure 21:
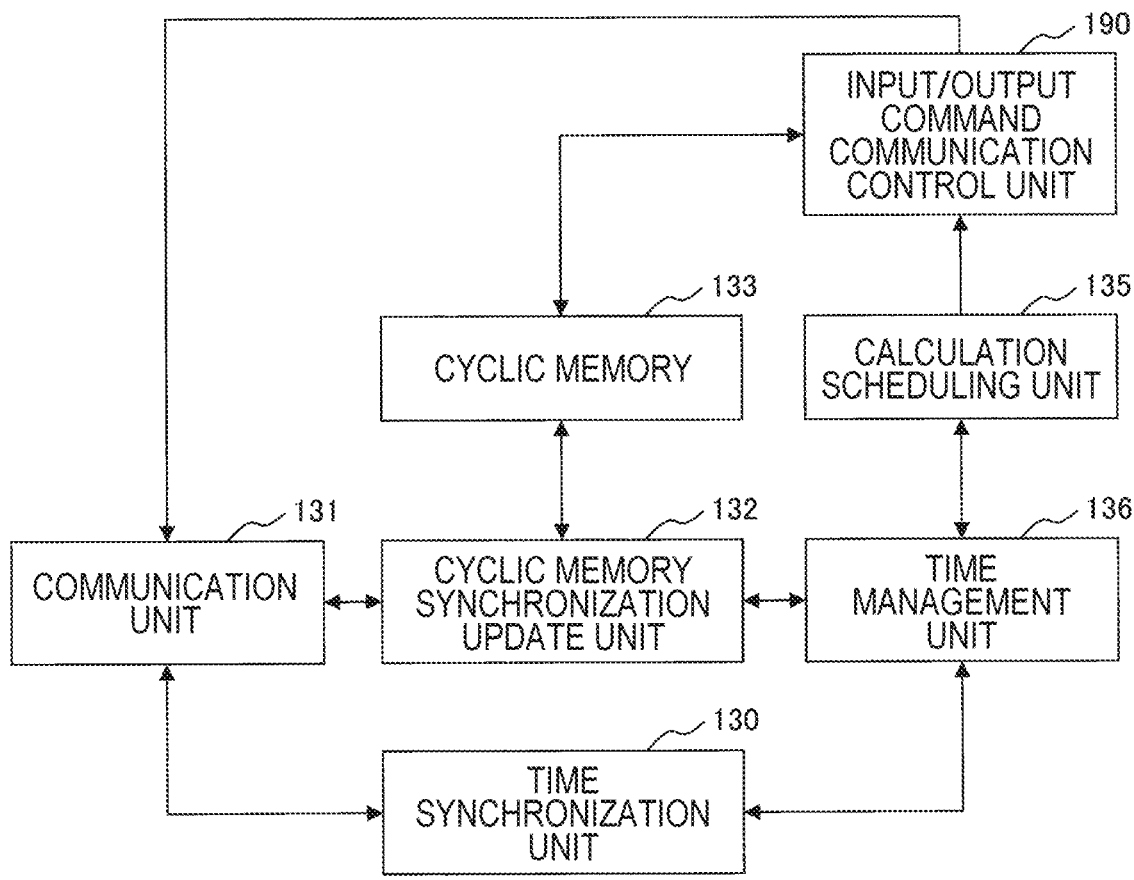
FIG. 21 is a functional configuration diagram illustrating an embodiment of the present invention.

An intelligent edge 180 has the configuration of FIG. 21. An input/output command communication control unit 190 uses the communication unit 131 to communicate the input/output command with a field device 181 instead of the input/output control unit 137.

The input/output command communication control unit 190 is configured using any one or a plurality of the communication control IC 102, the software on the CPU 101, and the PHY 103.

Figure 22:
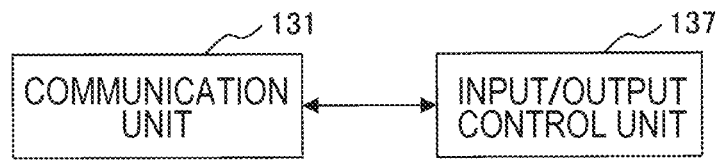
FIG. 22 is a functional configuration diagram illustrating an embodiment of the present invention.

A configuration of the field device 181 is illustrated in FIG. 22. The field device 181 receives an input/output command from the intelligent edge 180 and transmits sensor information to the field device 181, or controls the output of an actuator by the input/output control unit 137. Note that the transmission of the sensor information and the output control of the actuator may be periodically executed instead of being activated by an input/output command from the intelligent edge 180. At this time, the output control of the actuator is based on the command value received from the intelligent edge 180, for example.

The intelligent edge 180 transmits a sensor information acquisition request to the field device 181 instead of the sensor processing at t_in of FIG. 13, and similarly transmits an output command of the actuator to 181 at t_out. In the intelligent edge 180, the timing of t_in and t_out may be adjusted as illustrated in FIG. 18 according to the processing time of the field device 181 and the communication delay with the field device 181. Note that the field device 181 may include only a function as a sensor or only a function as an actuator.

In addition, in the configuration of FIG. 20, the intelligent edge 180 and the field device 181 have a two-stage configuration, but the intelligent edge 180 may be configured in multiple stages to have a hierarchical structure of 3 or more layers. In addition, although the intelligent edge 180 and the field device 181 are directly connected in FIG. 20, a network according to an arbitrary topology may be configured.

(EtherCAT Hierarchical Structure)

Figure 23:
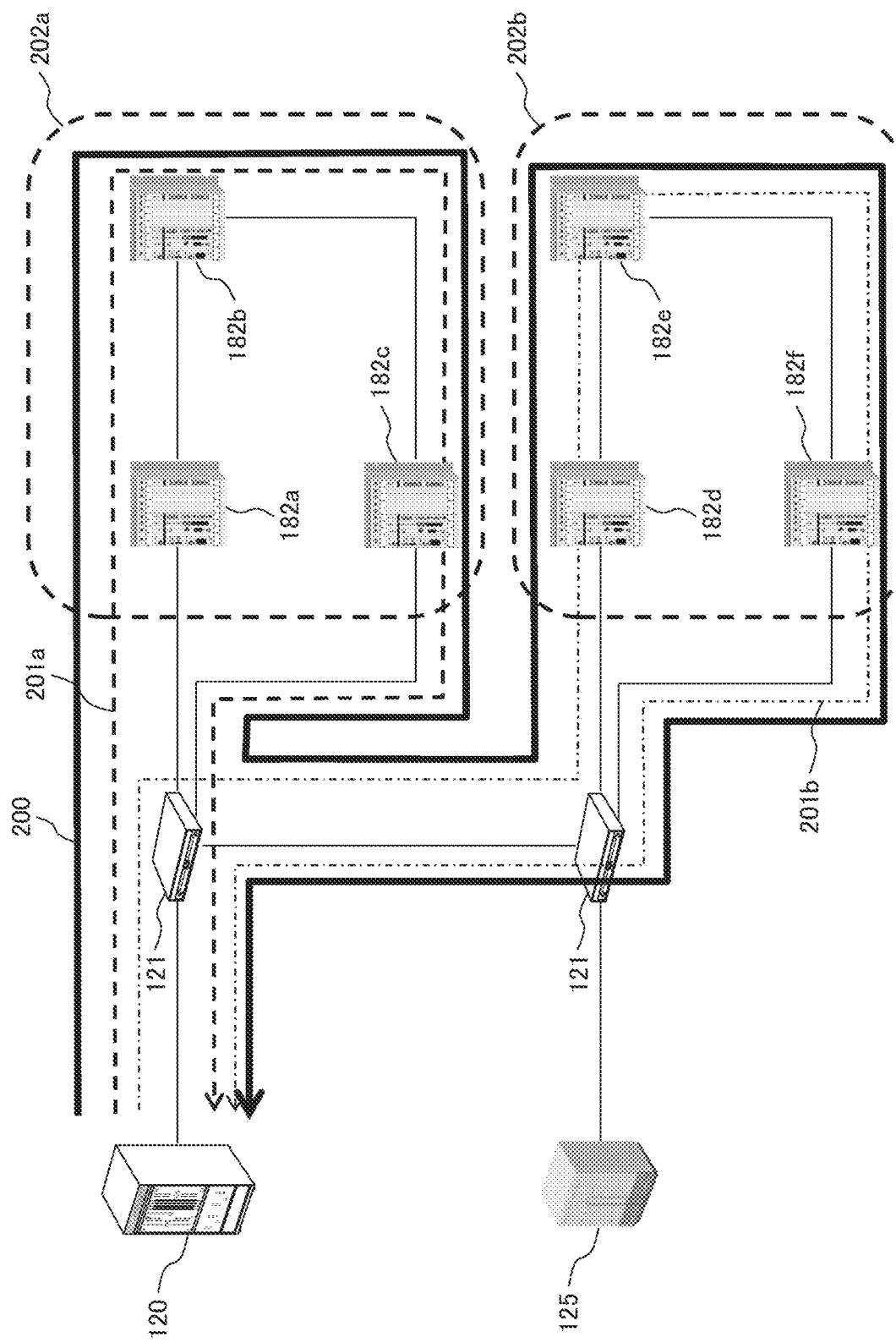
FIG. 23 is a system configuration diagram using an embodiment of the present invention.

Note that the control network 122 may be used between the intelligent edge 180 and the field device 181, and FIG. 23 illustrates a case where EtherCAT is applied.

In the EtherCAT communication, packets sequentially circulate on a ring network. Therefore, for example, in the configuration of FIG. 23, the packets are transmitted to slave devices 182a, 182b, 182c, 182d, 182e, and 182f in this order.

Here, it is exemplified that t_in is set on the basis of a difference in communication delay for each device in the configuration of FIG. 18.

In EtherCAT, the first slave is the time master. Therefore, a PCP of a VLAN tag is set such that the packet in the time synchronization protocol of EtherCAT (Distributed Clock (DC)) passes through a path 200, and a time slot of the network relay device 121 is planned. For example, the PCP of the VLAN tag is installed so that the control command in each EtherCAT subnetwork passes through paths 201a and 201b of individual control systems 202a and 202b, and the time slot of the network relay device 121 is planned.

Addition of Node

Next, a case where the control device 120 and the input/output control device 123 are added and removed after the start of operation will be described. In the case of adding or removing a node, S020 and S021 in FIG. 8 are executed again.

In order to enable dynamic addition or removal of a node without stopping the control system, it is necessary to distribute and communicate the settings of the control device 120 and the network relay device 121 after the replanning from the network management device 125. Therefore, it is exemplified that the reservation (time slot or the like) of the communication resource for communicating the setting content after the configuration change is planned in advance in S021 at the time of executing the procedure of FIG. 8.

In addition, in each control device 120, the calculation scheduling unit 135 of the input/output control device 123, and the time management unit 136, the timing to update the content notified from the network management device 125 may be planned. For example, an interrupt may be generated at a time before a setting update time Tupdate from t_in in FIG. 13 to start the update processing, or the update may be performed in an unoperating time zone in the device.
(Multiple Cycles of Superimposition)

Note that, although the configuration of FIG. 13 illustrates the processing of each device in one cycle Tloop, there may be communication that occurs every plurality of cycles with this cycle as one unit.

For example, there may be a case where monitoring data is transmitted every 10 cycles of the control loop of FIG. 13, or a case where a certain amount of data is transmitted (for example, one frame of an image or a moving image, or the like) within 50 cycles although there is no constraint of a minimum communication amount within each cycle instead of every cycle. In such a case, in addition to the processing from t_in to t_end in FIG. 13, an additional communication time zone may be added to form one cycle, or it is exemplified that availability of communication is confirmed between devices that execute the corresponding communication, and the additional communication is scheduled in S021 in FIG. 8. In such a case, for example, in a case where a group of data is transmitted in a plurality of cycles, the data may be divided and communicated in each cycle.
(Synchronization Abnormality)

Note that changing the response at the time of synchronization abnormality is exemplified. Such synchronization abnormality is exemplified by that a synchronization packet is not transmitted from a communication partner for a predetermined time in time synchronization via a communication protocol. In addition, in a time synchronization method such as GPS, it is also exemplified that a signal from a satellite cannot be received due to a failure of a corresponding device or an environmental change.

In such a case, it is exemplified to notify the outside that there is an abnormality, and continue to designate the synchronization time by utilizing the synchronization information at the time of synchronization as it is. Here, examples of the synchronization information include constants of a proportional term, an integral term, and a differential term in a case where a feedback loop of the system time and the local time is formed using PID control.

Alternatively, in the case of the input/output control device 123 serving as an actuator, the output is controlled in any of the 0-order hold, the primary hold, and the fail-safe state.

Alternatively, it is exemplified that an emergency spare time slot is provided on the control network 122, and the time slot is used by changing a priority code point (PCP) on a packet at the time of communication of a sensor or a control command. This time slot is planned in S021 in FIG. 8 in advance.

In this way, even if the network relay device 121 receives a packet from a device in which synchronization abnormality occurs at an arbitrary timing, the packet is transferred after waiting until a spare time slot. Then, the reception device can detect that communication is performed using a time slot different from the original time slot, and handle the received information differently. For example, it is possible to take measures such as not using the information, lowering the weight when performing statistical processing, and lowering the reliability. Note that it may be indicated that a synchronization abnormality has occurred in the data area of the communication packet without changing the time slot.
(Other than Cyclic Memory)

Note that the present embodiment has described the invention with respect to the cyclic memory, but is not limited to the cyclic memory. For example, an area for each device constituting the control system may be allocated on a virtual address space. As such an example, the logical address space of EtherCAT is shown.

In the logical address space, an address space for each device can be arbitrarily arranged. For example, the sensor (input/output control device 123) can be allocated for each bit unit of a predetermined area.

Alternatively, a plurality of devices can access the same area (broadcast read command (BRD) of EtherCAT) by diversifying access commands.

In addition, logical sum writing (broadcast write command (BWR) of EtherCAT) from a plurality of devices is also possible. Further, it is also possible to perform an operation such as a process of validating the writing by the last accessed packet (logical write command (LWR) of EtherCAT). This facilitates access to a plurality of devices and access from a plurality of devices with a small number of packets.

Alternatively, instead of synchronizing the data areas between the devices, the generation time, the calculation time, and the output time of the data stored in the data area may be managed in association with each updated data area. For example, in the case of the sensor information, a combination of the time when the sensor information is acquired and the sensor information may be managed as the data area.

Alternatively, in the case of a control command, the control command may be stored in the data area at a time at which the control command is calculated, at a time at which the control command is to be output, or in combination of both times.

Alternatively, in the case of the actuator output, a combination of the output time and the output command may be managed as the data area.

In this way, a configuration in which the corresponding information (sensor information, control command, and output value) and the related time information are managed in association with each other is exemplified. In such a case, although not all the devices are synchronized as the data area, the performance of the control system can be enhanced by using each data and the synchronized time related thereto on the basis of the synchronized time system, and the error from the theoretical performance can be reduced.
(Delay Guarantee)

In the present embodiment, the configuration in which the communication delay is guaranteed using the time slot type communication conforming to the TSN has been described, but the communication method of the control network 122 is not limited to the time slot type communication. Such a communication scheme may be adopted as long as the control network 122 can guarantee the worst communication delay.
(Effects)

With the above configuration, since the sensor acquisition timings are synchronized among the plurality of sensors, the environmental information at the same time can be acquired even if the devices are physically separated via the network in the entire control system. As a result, an error from the design value can be reduced, and the control performance can be improved. In addition, in realization of a simulation or a digital twin that reproduces a control system in a cyberspace on the basis of acquired information, sensor information with higher accuracy and high quality can be handled, so that the accuracy of the configuration of the simulation and the digital twin can be improved. As a result, the control system design and operation of the control system can be easily advanced and improved in performance.

In addition, by synchronizing output timings of a plurality of actuators, highly accurate control can be performed. Further, sensor information, arithmetic processing of control calculation, and input/output processing can be made redundant, and the control system can be made highly reliable and high in performance. In addition, the controller configuration can be flexibly changed according to a change in a requirement of the control system. Therefore, the control system can be appropriately designed from the cost requirement and required performance of the control system. Further, by synchronizing data between devices constructing the distributed control system, an arbitrary task can be executed at an arbitrary timing, computer resources can be efficiently used, and the distributed control system can be constructed at low cost.

As described above, according to the present embodiment, it is possible to provide a control system that improves control performance and reliability of the control system and is excellent in utilization efficiency of network resources of the control network.

REFERENCE SIGNS LIST

101 CPU
102 communication control IC
103 PHY
104 memory
105 nonvolatile storage media
106 bus
107 input/output unit
120 control device
121 network relay device
122 control network
123 input/output control device
124 controlled device
125 network management device
130 time synchronization unit
131 communication unit
132 cyclic memory synchronization update unit
133 cyclic memory
134 calculation unit
135 calculation scheduling unit
136 time management unit
137 input/output control unit
140, 143 communication
141, 144 buffer storage processing
142, 145 cyclic memory reflecting process
150 control calculation
151 task
152 redundancy control task
153, 162 retransmission request
160, 161 retransmission process
170 device data area
171 sensor a area
172 sensor b area
173 actuator area
174 status a area
175 actuator b area
176, 177, 178 undefined area
180 intelligent edge
181 field device
182 slave device
190 input/output command communication control unit
200, 201 path
202 control system

The invention claimed is:

1. A first control device constituting a distributed control system for performing control on a controlled device, the first control device comprising:
communication control integrated circuit;
a first buffer memory;
a first memory;
a central processing unit (CPU) configured to:
execute time synchronization with respect to a second control device that is another control device constituting the distributed control system so that respective clocks of the first control device and the second control device are synchronized, the second control device having a second buffer and a second memory,
receive, via the communication control integrated circuit, reception information related to the second control device, the reception information including a control command value for controlling the controlled device,
temporarily store the reception information in the first buffer memory,
issue a first interrupt at a first synchronized time based on the time synchronization,
upon the first interrupt being issued, store the received reception information into the first memory in synchronization with the second control device storing data from the second buffer into the second memory of the second control device, and
issue a second interrupt at a second synchronized time based on the time synchronization, and
upon the second interrupt being issued, read the control command value stored in the first memory and output a signal based on the control command value to the controlled device.

2. The control device according to claim 1,
wherein the CPU is configured calculate the control command value for performing control on the controlled device and transfer the received information to a third device constituting the distributed control system.

3. The control device according to claim 1,
wherein the reception information includes sensor information for the controlled device.

4. A distributed control system, comprising:
a plurality of control devices including a first control device configured to control a controlled device, and a second control device,
wherein the first control device includes:
communication control integrated circuit;
a first buffer memory;
a first memory;
a central processing unit (CPU) configured to:
execute time synchronization with respect to the second control device, the second control device including a second buffer and a second memory,
receive, via the communication control integrated circuit, reception information related to the second control device, the reception information including a command control value for controlling the controlled device,
temporarily store the reception information in the first buffer memory,
issue a first interrupt at a first synchronized time based on the time synchronization,
upon the first interrupt being issued, store the received reception information into the first memory in synchronization with the second control device storing data from the second buffer into the second memory of the second control device, and issue a second interrupt at a second synchronized time based on the time synchronization, and upon the second interrupt being issued, read the control command value stored in the first memory and output a signal based on the control command value to the controlled device.

5. The distributed control system according to claim 4, wherein each of the plurality of control devices communicates with each other by time slot communication conforming to Time Sensitive Networking (TSN).

6. The distributed control system according to claim 4, wherein the distributed control system includes a plurality of first control devices, and wherein each of the plurality of first control devices calculate the command value for a third control device constituting the distributed control system on a basis of content of the common data area, and transmit the command value to the third control device.

7. The distributed control system according to claim 6, further comprising:

a fourth control device constituting the distributed control system, which transmits the command value to the third control device with a time difference from the first control device.

* * * * *